(12) United States Patent
Mistry

(10) Patent No.: US 10,635,719 B2
(45) Date of Patent: *Apr. 28, 2020

(54) PATTERN MATCHING MACHINE WITH MAPPING TABLE

(71) Applicant: BRITISH TELECOMMUNICATIONS PUBLIC LIMITED COMPANY, London (GB)

(72) Inventor: James Mistry, London (GB)

(73) Assignee: BRITISH TELECOMMUNICATIONS PLC, London (GB)

( * ) Notice: Subject to any disclaimer, the term of this patent is extended or adjusted under 35 U.S.C. 154(b) by 406 days.

This patent is subject to a terminal disclaimer.

(21) Appl. No.: 15/107,250

(22) PCT Filed: Nov. 27, 2014

(86) PCT No.: PCT/GB2014/053517
§ 371 (c)(1),
(2) Date: Jun. 22, 2016

(87) PCT Pub. No.: WO2015/097428
PCT Pub. Date: Jul. 2, 2015

(65) Prior Publication Data
US 2017/0032054 A1   Feb. 2, 2017

(30) Foreign Application Priority Data
Dec. 23, 2013   (EP) .................................... 13250123

(51) Int. Cl.
G06F 16/903   (2019.01)
G06N 5/04   (2006.01)

(52) U.S. Cl.
CPC ....... *G06F 16/90344* (2019.01); *G06N 5/047* (2013.01)

(58) Field of Classification Search
None
See application file for complete search history.

(56) References Cited

U.S. PATENT DOCUMENTS 5,995,963 A   11/1999   Nanba
7,783,654 B1   8/2010   Sreenath
(Continued)

OTHER PUBLICATIONS

International Search Report for PCT/GB2014/053517, dated Feb. 5, 2015, 3 pages.
(Continued)

*Primary Examiner* — Christopher J Raab
(74) *Attorney, Agent, or Firm* — Nixon & Vanderhye PC

(57) ABSTRACT

A computer implemented method for generating a pattern matching machine for identifying matches of a plurality of symbol patterns in a sequence of input symbols, the method comprising: providing a state machine of states and directed transitions between states corresponding to the plurality of patterns; applying an Aho-Corasick approach to identify one or more mappings between states in the event of a failure, of the state machine in a state and for an input symbol, to transition to a subsequent state based on the directed transitions of the state machine, characterised in that one of the symbol patterns includes a wildcard symbol, and a mapping for a state representing pattern symbols including the wildcard symbol is provided in a hash table referenced based on a key, the key being based on a unique identifier of the state and the input symbol to be received, by the pattern matching machine in use, to constitute the wildcard symbol.

22 Claims, 23 Drawing Sheets

(56) References Cited

U.S. PATENT DOCUMENTS

| | | | |
|---|---|---|---|
| 7,889,727 | B2 | 2/2011 | Miller |
| 8,527,488 | B1 | 9/2013 | Starovoitov |
| 8,572,106 | B1* | 10/2013 | Estan ................. G06F 17/30985 707/758 |
| 8,818,923 | B1* | 8/2014 | Hoffmann ......... G06F 17/30985 706/18 |
| 8,862,603 | B1 | 10/2014 | Watson |
| 2007/0006293 | A1 | 1/2007 | Balakrishnan |
| 2007/0011734 | A1* | 1/2007 | Balakrishnan ........ H04L 43/026 726/13 |
| 2007/0088955 | A1 | 4/2007 | Lee |
| 2007/0282835 | A1 | 12/2007 | Duxbury |
| 2008/0071757 | A1 | 3/2008 | Ichiriu |
| 2008/0133583 | A1* | 6/2008 | Artan .................... G06F 21/564 |
| 2010/0229040 | A1 | 9/2010 | Chen |
| 2011/0016142 | A1 | 1/2011 | Chen |
| 2012/0221494 | A1 | 8/2012 | Pasetto |
| 2013/0036954 | A1* | 2/2013 | Hacker .................. B65D 88/68 110/229 |
| 2013/0086017 | A1 | 4/2013 | Chao |
| 2014/0019486 | A1* | 1/2014 | Majumdar ........ G06F 17/30424 707/780 |
| 2014/0317134 | A1 | 10/2014 | Chen |
| 2016/0335374 | A1 | 11/2016 | Mistry |
| 2016/0371594 | A1 | 12/2016 | Mistry |

OTHER PUBLICATIONS

G. J. Berlin, "A Direct Method for String to Deterministic Finite Automaton Conversion for Fast Text Searching", Oct. 21, 1991, (22 pages).

Chad Meiners, et al., "Fast Regular Expression Matching using Small TCAMs for Network Intrusion Detection and Prevention Systems", Mar. 31, 2014 (16 pages).

International Search Report issued in PCT/GB2014/053515 dated May 2, 2015, 3 pages.

Office Action dated Jun. 14, 2018 in related U.S. Appl. No. 15/107,237, 39 pages.

Katashita et al., Highly Efficient String Matching Circuit for IDS with FPGA, 14th Annual IEEE Symposium on Field-Programmable Custom Computing Machines, 2006, 2 pages total (Year: 2006).

Yamagaki et al., High-Speed Regular Expression Matching Engine Using Multi-Character NFA, IEEE, 2008, pp. 131-136 (Year: 2008).

Chen et al., An Efficient Multicharacter Transition String-Matching Engine Based on the Aho-Corasick Algorithm, ACM Transactions on Architecture and Code Optimization, vol. 10, No. 4, Article 25, Dec. 2013, 22 pages total (Year: 2013).

Aho, et al., "Compilers, Principles, Techniques and Tools", Addision-Wesley Publishing Co., Jan. 1, 1986, pp. 1-1038 (including pp. 121 and 128-158).

Search Report dated Nov. 20, 2018 in related EP Application No. 14806703.6, 9 pages.

Search Report dated Nov. 20, 2018 in related EP Application No. 14806704.4, 4 pages.

Search Report dated Nov. 20, 2018 in related EP Application No. 14806705.1, 4 pages.

Portable Operating Systemm Interface) Basic Regular Expression Syntax (BRE) According to IEEE Standard 1003.1' 2004, 510 pages.

Antonino Tumeo; Daniel Chavarria-Miranda: "Aho-Corasick String Matching on Shared and Distributed-Memory Parallel Architectures", IEEE Transactions on Parallel and Distributed Systems, vol. 23, No. 3, Mar. 2012 (Mar. 2012), 8 pages.

International Search Report dated May 2, 2015 in related International Application No. PCT/GB2014/053518.6, 3 pages.

* cited by examiner

FIGURE 18a

| 1: Find_Failure_States ( '0', 'a.c' ) (i.e. n=3) | Globals<br>failure_state = {}<br>stack = {} |
|---|---|
| (5) transitionStates = find_transition_states('0', 'a') =<br>　　　　　　　　　　　　　　　　　　{{'a','5'}}<br>(6) is false since transitionStates = {{'a','5'}}<br>(9) for state$_T$='5'; T='a':<br>　　　(11) is false since a$_1$='a'<br>　　　(12) is false since n=3<br>　　　(17) Find_Failure_States( '5', '.c') (*recurse to 1.1*)<br><br>　　　(18) is false since a$_1$='a'<br>(19) end-loop<br>(21) return (end) | <br><br><br><br><br><br><br>failure_state =<br>　{ ('9', {'b'}, 0), ('8', {'.'}, 0) } |

FIGURE 18b

| 1.1: Find_Failure_States ( '5', '.c' ) (i.e. n=2) | Globals<br>failure_state = {}<br>stack = {} |
|---|---|
| (5) transitionStates = find_transition_states('5', '.') =<br>　　　　　　　　　　　　　　　　{{'b','6'}, {'7','.'}}<br>(6) is false since transitionStates = {{'b','6'}, {'7','.'}}<br>(9) for state$_T$='6'; T='b':<br>　　　(11) is true since a$_1$='.'; push 'b' to stack<br>　　　(12) is false since n=2<br>　　　(17) Find_Failure_States( '6', 'c') (*recurse to 1.1.1*)<br>　　　(18) is true since a$_1$='.'; pop stack<br>(9) for state$_T$='7'; T='.':<br>　　　(11) is true since a$_1$='.'; push '.' to stack<br>　　　(12) is false since n=2<br>　　　(17) Find_Failure_States( '7', 'c') (*recurse to 1.1.2*)<br><br>　　　(18) is true since a$_1$='.'; pop stack<br>(19) end-loop<br>(21) return (to 1) | <br><br><br><br><br>stack = {'b'}<br><br>failure_state = { ('9', {}, 0) }<br>stack = {}<br><br>stack = {'.'}<br><br><br>failure_state =<br>　{ ('9', {'b'}, 3), ('8', {'.'}, 0) }<br>stack = {} |

FIGURE 18c

| 1.1.1: Find_Failure_States ( '6', 'c' ) (i.e. n=1) | Globals<br>failure_state = {}<br>stack = {'b'} |
|---|---|
| (5) transitionStates = find_transition_states('6', 'c') =<br>   {{'c','9'}}<br>(6) is false since transitionStates = {{'c','9'}}<br>(9) for $state_T$='9'; T='c':<br>   (11) is false since $a_1$='c'<br>   (12) is true since n=1<br>   (14) output = 3 since $state_T.output$ = { }<br>   (15) failure_set ∪= ('9', {'b'}, 0)<br>   (18) is false since $a_1$='c'<br>(19) end-loop<br>(21) return (to 1.1) | failure_state = { ('9', {'b'}, 0) } |

FIGURE 18d

| 1.1.2: Find_Failure_States ( '7', 'c' ) (i.e. n=1) | Globals<br>failure_state = { ('9', {'b'}, 0) }<br>stack = {'.'} |
|---|---|
| (5) transitionStates = find_transition_states('7', 'c') =<br>   {{'c','8'}}<br>(6) is false since transitionStates = {{'c','8'}}<br>(9) for $state_T$='8'; T='c':<br>   (11) is false since $a_1$='c'<br>   (12) is true since n=1<br>   (14) output = 0 since $state_T.output$ = { }<br>   (15) failure_set ∪= ('8', {'.'}, 0)<br><br>   (18) is false since $a_1$='c'<br>(19) end-loop<br>(21) return (to 1.1) | failure_state =<br>  { ('9', {'b'}, 0), ('8', {'.'}, 0) } |

FIGURE 24

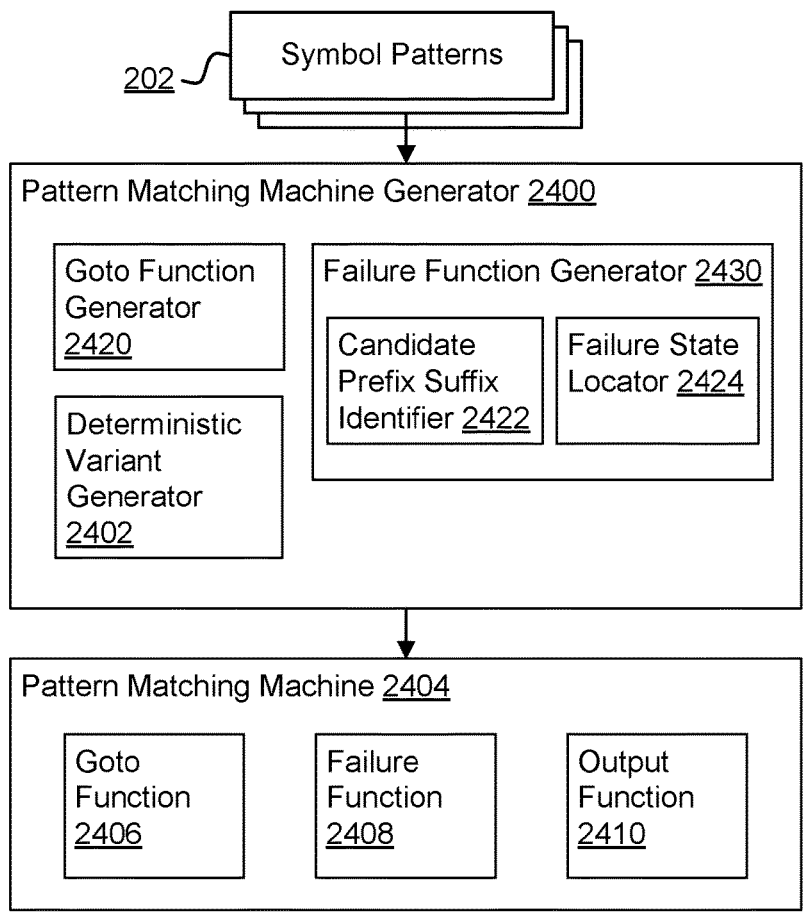

FIGURE 25a

| 1: gdv ( { ('a',literal), ('b',+), ('cd', literal) } )<br>(variants=V; pattern_stack=P; consumed = C) | Globals<br>V = {}<br>P = {}<br>C = 0; max_span = 7 |
|---|---|
| (2) true since ('a', literal)<br>    (4) C = 0+1 = 1<br>    (5) push 'a' to P<br>    (6) nonempty set;<br>        (8) gdv ({('b',+), ('cd', literal)}) (1.1) | C = 1<br>P = {'a'}<br><br>V = { {'a', 'b', 'cd'}, {'a', 'b', 'b', 'cd'}, {'a', 'b', 'b', 'b', 'cd'}, {'a', 'b', 'b', 'b', 'b', 'cd'} } |
| (10) false since C (1) < max_span<br>(49) false since nonempty<br>(54) pop 'cd' from P<br>(55) C = 1 – 1 = 0<br>(56) return | P = {}<br>C = 0 |

FIGURE 25b-1

| 1.1: gdv ( { ('b', +), ('cd', literal) } )<br>(variants=V, pattern_stack=P, consumed = C) | Globals<br>V = {}<br>P = {'a'}<br>C = 1, max_span = 7 |
|---|---|
| (2) false since ('b', +)<br>    (19) j = 0<br>    (20) true<br>    (22) C = 1+1 = 2<br>    (23) push 'b' to P<br>    (24) j = 0 + 1 = 1<br>    (27) true since C (2) < max_span<br>        (28) true since nonempty<br>            (30) gdv ({('cd', literal)}) (1.1.1)<br><br><br>    (33) C = 2 + 1 = 3<br>    (34) push 'b' to P<br>    (35) j = 1 + 1 = 2<br>    (27) true since C (3) < max_span<br>        (28) true since nonempty<br>            (30) gdv ({('cd', literal)}) (1.1.2)<br><br><br><br>    (33) C = 3 + 1 = 4<br>    (34) push 'b' to P<br>    (35) j = 2 + 1 = 3<br>    (27) true since C (4) < max_span<br>        (28) true since nonempty<br>            (30) gdv ({('cd', literal)}) (1.1.3)<br><br><br><br><< continues on Figure 25b-2 >> | <br><br><br><br>C = 2<br>P = {'a','b'}<br><br><br><br>V = { {'a', 'b', 'cd'} }<br>P = {'a', 'b'}<br>C = 2<br>C = 3<br>P = {'a', 'b', 'b'}<br><br><br><br>V = { {'a', 'b', 'cd'}, {'a', 'b', 'b', 'cd'} }<br>P = {'a', 'b', 'b'}<br>C = 3<br>C = 4<br>P = {'a', 'b', 'b', 'b'}<br><br><br><br>V = { {'a', 'b', 'cd'}, {'a', 'b', 'b', 'cd'}, {'a', 'b', 'b', 'b', 'cd'} }<br>P = {'a', 'b', 'b', 'b'}<br>C = 4 |

FIGURE 25b-2

```
<< continued from Figure 25b-1 >>

(33) C = 4 + 1 = 5                          C = 5
        (34) push 'b' to P                          P = {'a', 'b', 'b', 'b', 'b'}
        (35) j = 3 + 1 = 4
    (27) true since C (5) < max_span
        (28) true since nonempty
            (30) gdv ({('cd', literal)}) (1.1.4)   V = { {'a', 'b', 'cd'}, {'a', 'b', 'b',
                                                    'cd'}, {'a', 'b', 'b', 'b', 'cd'}, {'a',
                                                    'b', 'b', 'b', 'b', 'cd'} }
                                                    P = {'a', 'b', 'b', 'b', 'b'}
                                                    C = 5
        (33) C = 5 + 1 = 6                          C = 6
        (34) push 'b' to P                          P = {'a', 'b', 'b', 'b', 'b', 'b'}
        (35) j = 4 + 1 = 5
    (27) true since C (6) < max_span
        (28) true since nonempty
            (30) gdv ({('cd', literal)}) (1.1.5)
        (33) C = 6 + 1 = 7                          C = 7
        (34) push 'b' to P                          P = {'a', 'b', 'b', 'b', 'b', 'b', 'b'}
        (35) j = 5 + 1 = 6
    (27) true since C (7) < max_span
        (28) true since nonempty
            (30) gdv ({('cd', literal)}) (1.1.6)
        (33) C = 7 + 1 = 8                          C = 8
        (34) push 'b' to P                          P = {'a', 'b', 'b', 'b', 'b', 'b', 'b',
        (35) j = 6 + 1 = 7                          'b'}
    (27) false since C (9) > max_span
    (37) true since C (9) > max_span
    (39) iterate (41) and (42) j (7) times          P = {'a'}
                                                    C = 1
    (45) return (1)
```

FIGURE 25c

| 1.1.1: gdv ( { ('cd', literal) ) <br> (variants=V; pattern_stack=P; consumed = C) | Globals <br> V = {} <br> P = {'a', 'b'} <br> C = 2; max_span = 7 |
|---|---|
| (2) true since ('cd', literal) <br>     (4) C = 2+2 = 4 <br>     (5) push 'cd' to P <br>     (6) empty set <br>     (10) false since C (4) < max_span <br> (49) true since empty set <br> (51) add P to V <br> (54) pop 'cd' from P <br> (55) C = 4 − 2 = 2 <br> (56) return (1.1) | C = 4 <br> P = {'a', 'b', 'cd'} <br><br><br><br> V = { {'a', 'b', 'cd'} } <br> P = {'a', 'b'} <br> C = 2 |

FIGURE 25d

| 1.1.2: gdv ( { ('cd', literal) ) <br> (variants=V; pattern_stack=P; consumed = C) | Globals <br> V = { {'a', 'b', 'cd'} } <br> P = {'a', 'b', 'b'} <br> C = 3; max_span = 7 |
|---|---|
| (2) true since ('cd', literal) <br>     (4) C = 3+2 = 5 <br>     (5) push 'cd' to P <br>     (6) empty set <br>     (10) false since C (5) < max_span <br> (49) true since empty set <br> (51) add P to V <br><br> (54) pop 'cd' from P <br> (55) C = 5 − 2 = 3 <br> (56) return (1.1) | C = 5 <br> P = {'a', 'b', 'b', 'cd'} <br><br><br><br> V = { {'a', 'b', 'cd'}, {'a', 'b', 'b', 'cd'} } <br> P = {'a', 'b', 'b'} <br> C = 3 |

FIGURE 25e

| 1.1.3: gdv ( { ('cd', literal) ) <br> (variants=V; pattern_stack=P; consumed = C) | Globals <br> V = { {'a', 'b', 'cd'}, {'a', 'b', 'b', 'cd'} } <br> P = {'a', 'b', 'b', 'b'} <br> C = 4; max_span = 7 |
|---|---|
| (2) true since ('cd', literal) <br>     (4) C = 4+2 = 6 <br>     (5) push 'cd' to P <br>     (6) empty set <br>     (10) false since C (6) < max_span <br> (49) true since empty set <br> (51) add P to V <br><br> (54) pop 'cd' from P <br> (55) C = 6 – 2 = 4 <br> (56) return (1.1) | C = 6 <br> P = {'a', 'b', 'b', 'b', 'cd'} <br><br><br><br> V = { {'a', 'b', 'cd'}, {'a', 'b', 'b', 'cd'}, {'a', 'b', 'b', 'b', 'cd'} } <br> P = {'a', 'b', 'b', 'b'} <br> C = 4 |

FIGURE 25f

| 1.1.4: gdv ( { ('cd', literal) ) <br> (variants=V; pattern_stack=P; consumed = C) | Globals <br> V = { {'a', 'b', 'cd'}, {'a', 'b', 'b', 'cd'}, {'a', 'b', 'b', 'b', 'cd'} } <br> P = {'a', 'b', 'b', 'b', 'b'} <br> C = 5; max_span = 7 |
|---|---|
| (2) true since ('cd', literal) <br>     (4) C = 5+2 = 7 <br>     (5) push 'cd' to P <br>     (6) empty set <br>     (10) false since C (7) = max_span <br> (49) true since empty set <br> (51) add P to V <br><br><br> (54) pop 'cd' from P <br> (55) C = 7 – 2 = 5 <br> (56) return (1.1) | C = 7 <br> P = {'a', 'b', 'b', 'b', 'b', 'cd'} <br><br><br><br> V = { {'a', 'b', 'cd'}, {'a', 'b', 'b', 'cd'}, {'a', 'b', 'b', 'b', 'cd'}, {'a', 'b', 'b', 'b', 'b', 'cd'} } <br> P = {'a', 'b', 'b', 'b', 'b'} <br> C = 5 |

FIGURE 25g

| 1.1.5: gdv ( { ('cd', literal) ) <br> (variants=V; pattern_stack=P; consumed = C) | Globals <br> V = { {'a', 'b', 'cd'}, {'a', 'b', 'b', 'cd'}, {'a', 'b', 'b', 'b', 'cd'}, {'a', 'b', 'b', 'b', 'b', 'cd'} } <br> P = {'a', 'b', 'b', 'b', 'b', 'b'} <br> C = 6; max_span = 7 |
|---|---|
| (2) true since ('cd', literal) <br>    (4) C = 6+2 = 8 <br>    (5) push 'cd' to P <br>    (6) empty set <br>    (10) true since C (8) > max_span <br>      (12) pop 'cd' from P <br>      (13) C = 8-2 = 6 <br>      (14) return (1.1) | C = 8 <br> P = {'a', 'b', 'b', 'b', 'b', 'b', 'cd'} <br><br><br> P = {'a', 'b', 'b', 'b', 'b', 'b'} <br> C = 6 |

FIGURE 25h

| 1.1.6: gdv ( { ('cd', literal) ) <br> (variants=V; pattern_stack=P; consumed = C) | Globals <br> V = { {'a', 'b', 'cd'}, {'a', 'b', 'b', 'cd'}, {'a', 'b', 'b', 'b', 'cd'}, {'a', 'b', 'b', 'b', 'b', 'cd'} } <br> P = {'a', 'b', 'b', 'b', 'b', 'b', 'b'} <br> C = 7; max_span = 7 |
|---|---|
| (2) true since ('cd', literal) <br>    (4) C = 7+2 = 9 <br>    (5) push 'cd' to P <br><br>    (6) empty set <br>    (10) true since C (9) > max_span <br>      (12) pop 'cd' from P <br>      (13) C = 9-2 = 7 <br>      (14) return (1.1) | C = 9 <br> P = {'a', 'b', 'b', 'b', 'b', 'b', 'b', 'cd'} <br><br><br> P = {'a', 'b', 'b', 'b', 'b', 'b', 'b'} <br> C = 7 |

PATTERN MATCHING MACHINE WITH MAPPING TABLE

This application is the U.S. national phase of International Application No. PCT/GB2014/053517 filed 27 Nov. 2014, which designated the U.S. and claims priority to EP Patent Application No. 13250123.0 filed 23 Dec. 2013, the entire contents of each of which are hereby incorporated by reference.

FIELD OF THE INVENTION

The present invention relates to an improved pattern matching machine. In particular, it relates to an efficient pattern matching machine that accommodates indeterminate symbols in symbol patterns.

BACKGROUND OF THE INVENTION

Pattern matching algorithms provide for the identification of locations of occurrences of one or more patterns of symbols, such as characters or tokens from a symbol alphabet, within a symbol sequence. A specific type of pattern matching is string matching whereby locations of occurrences of one or more strings are identified within a larger string. Pattern matching finds applications in text searching such as bibliographic searching, DNA and protein sequence analysis, data mining, security systems such as intrusion detection systems, anti-virus software and machine learning problems.

An approach to string matching is described by Alfred Aho and Margaret Corasick in their 1975 paper "Efficient String Matching: An Aid to Bibliographic Search". Known as the Aho-Corasick approach, the paper proposes a technique that involves the construction of a non-deterministic finite-state automaton as a pattern matching machine from search patterns (keywords). Each state of the automaton corresponds to a partial or complete sequence of symbols of a search pattern. The pattern matching machine is used to process a text string in a single pass to identify occurrences of search patterns in the text string. The Aho-Corasick approach employs a "goto" function and a "failure" function. The goto function maps a pair, consisting of a current state of an automaton and an input symbol from a text string, to a state or a "fail" condition. Thus the goto function effectively provides directed transitions between states in the automaton. The failure function is responsive to the fail condition of the goto function and maps a current state of the automaton to a new state. The new state is identified as a state of the automaton corresponding to a longest proper suffix of the pattern symbol sequence of the mapped state, where such a new state exists. If such a new state does not exist in the automaton, the failure function maps to a starting state of the automaton.

The Aho-Corasick algorithm provides for an approach to single-pass matching of multiple strings by providing the failure function for mapping states to appropriate new states in the event that the goto function returns fail. However, the Aho-Corasick approach is limited to determinate search patterns due to the dependence, by the failure function, on pattern suffixes to identify new states in the event of failure of the goto function. That is to say search patterns including non-determinate features, such as non-literal symbols including wildcard symbols, cannot be mapped to a new state on failure of the goto function due to the indeterminate nature of a wildcard symbol. Such wildcard symbols can potentially correspond to any symbol in a symbol alphabet (or subsets thereof), whereas the failure function of the Aho-Corasick algorithm is only effective for a determined proper suffix of symbols in a search pattern.

For example, search patterns embodied as expressions often include wildcard symbols, such as the '.' metacharacter. Such expressions are found in many and varied applications including regular expressions, data validation, data extraction and search functions. Any existing approach to applying the Aho-Corasick algorithm to expressions including wildcards involves pre-processing and post-processing steps. During pre-processing, all sub-patterns of an expression that do not include wildcards are identified. An Aho-Corasick automaton is generated for each of the identified sub-patterns for use to identify the sub-patterns in an input symbol sequence. Subsequently, post-processing is required to determine if occurrences of the sub-patterns in the input sequence correspond to occurrences at particular offsets in accordance with the original expression. The requirement to undertake such pre- and post-processing for expressions imposes an undesirable resource and time constraint for the application of the Aho-Corasick approach.

Another non-determinate feature that can be employed in search patterns is an iteration feature, such as the '*' metacharacter (indicating 'zero or more') and the '+' metacharacter (indicating 'one or more'). For example, the symbol pattern 'ab*' corresponds to a symbol sequence including an 'a' symbol followed by any number of (zero or more) 'b' symbols. Notably, the number of 'b' symbols is potentially infinite. Due to the variable number of symbols matched by a pattern matching automaton which can change for, and within, an input symbol pattern, it is not known how to apply the Aho-Corasick approach of failure state mapping to symbol patterns including iterative metacharacters since symbol suffixes cannot be known at the time of generating the automaton.

Thus it is desirable to provide the benefits of the Aho-Corasick algorithm for pattern matching of expressions including wildcards without the aforementioned disadvantages.

SUMMARY OF THE INVENTION

The present invention accordingly provides, in a first aspect, a computer implemented method for generating a pattern matching machine for identifying matches of a plurality of symbol patterns in a sequence of input symbols, the method comprising: providing a state machine of states and directed transitions between states corresponding to the plurality of patterns; applying an Aho-Corasick approach to identify one or more mappings between states in the event of a failure, of the state machine in a state and for an input symbol, to transition to a subsequent state based on the directed transitions of the state machine, characterised in that one of the symbol patterns includes a wildcard symbol, and a mapping for a state representing pattern symbols including the wildcard symbol is provided in a hash table referenced based on a key, the key being based on a unique identifier of the state and the input symbol to be received, by the pattern matching machine in use, to constitute the wildcard symbol.

The present invention accordingly provides, in a second aspect, a computer implemented method for generating a pattern matching component for identifying matches of a plurality of symbol patterns in a sequence of input symbols, the method comprising: providing a state machine of states and directed transitions between states corresponding to the plurality of patterns such that the state machine includes at least a starting state and additional states, each additional state representing a state in a sequence of pattern symbols for one or more patterns; providing, for each state, a failure function for mapping each of one or more states, as a mapped state, to a new state in the state machine, the new state being identified as a state representing a pattern symbol sequence corresponding to a longest proper suffix of the pattern symbol sequence of the mapped state, and the failure function being operable in response to a determination that all directed transitions from the mapped state are not occasioned by an input character, wherein the new state is identified as the starting state in the absence of a state representing a pattern symbol sequence corresponding to a proper suffix of the pattern symbol sequence of the mapped state; characterised in that at least one pattern includes at least one wildcard symbol, and the failure function for each state representing a pattern symbol sequence including one or more wildcard symbols maps to one or more new states based on one or more input symbols to be received, by the pattern matching machine in use, to constitute each of the one or more wildcard symbols, the mapping being provided in a hash table referenced based on a key, the key being based on a unique identifier of the mapped state and the one or more input symbols to be received.

Thus embodiments of the present invention provide for an efficient approach to single-pass matching of multiple symbol patterns, where the patterns include one or more wildcard metacharacters, by providing a mapping for states to appropriate new states based on input symbols received to constitute the wildcard metacharacters. Using embodiments of the present invention it is possible to match multiple symbol patterns, one or more of which contain one or more wildcard characters, by conducting only a single pass over an input symbol sequence without backtracking and without any necessity for division or parallelisation of the process to search for each symbol pattern, or part of a symbol pattern, separately.

Preferably, a subset of the one or more of the input symbols to be received, by the pattern matching in use, is excluded from one or more input symbols used to determine the key.

Preferably, the excluded input symbols are input symbols corresponding to wildcard pattern symbols of one or more of the new states.

Preferably, the method further comprises providing an output function for selected states in the state machine, the selected states being states representing a pattern symbol sequence corresponding to one or more matched patterns.

Preferably, the pattern matching machine is generated as a software component for execution in a computer system.

The present invention accordingly provides, in a third aspect, a computer implemented method for pattern matching a plurality of symbol patterns in a sequence of input symbols, where at least one symbol pattern includes a wildcard symbol, the method comprising: receiving a pattern matching machine for the plurality of patterns, the pattern matching machine being generated in accordance with the method described above; and executing the pattern matching machine for symbols in the sequence of input symbols so as to trigger an output function for sub-sequences of symbols in the sequence of input symbols matching one or more symbol patterns.

The present invention accordingly provides, in a fourth aspect, a pattern matching machine generator for generating a pattern matching machine for identifying matches of a plurality of symbol patterns in a sequence of input symbols, the pattern matching machine generator comprising: a goto function generator component adapted to provide a state machine of states and directed transitions between states corresponding to the plurality of patterns; a failure function generator component adapted to apply an Aho-Corasick approach to identify one or more mappings between states in the event of a failure, of the state machine in a state and for an input symbol, to transition to a subsequent state based on the directed transitions of the state machine, characterised in that one of the symbol patterns includes a wildcard symbol, and a mapping for a state representing pattern symbols including the wildcard symbol is provided in a hash table referenced based on a key, the key being based on a unique identifier of the state and the input symbol to be received, by the pattern matching machine in use, to constitute the wildcard symbol.

The present invention accordingly provides, in a fifth aspect, a pattern matching machine generator for generating a pattern matching machine for identifying matches of a plurality of symbol patterns in a sequence of input symbols, the pattern matching machine generator comprising: a goto function generator component adapted to provide a state machine of states and directed transitions between states corresponding to the plurality of patterns such that the state machine includes at least a starting state and additional states, each additional state representing a state in a sequence of pattern symbols for one or more patterns; a failure function generator component adapted to provide, for each state, a failure function for mapping each of one or more states, as a mapped state, to a new state in the state machine, the new state being identified as a state representing a pattern symbol sequence corresponding to a longest proper suffix of the pattern symbol sequence of the mapped state, and the failure function being operable in response to a determination that all directed transitions from the mapped state are not occasioned by an input character, wherein the new state is identified as the starting state in the absence of a state representing a pattern symbol sequence corresponding to a proper suffix of the pattern symbol sequence of the mapped state; characterised in that at least one pattern includes at least one wildcard symbol, and the failure function for each state representing a pattern symbol sequence including one or more wildcard symbols maps to one or more new states based on one or more input symbols to be received, by the pattern matching machine in use, to constitute each of the one or more wildcard symbols, the mapping being provided in a hash table referenced based on a key, the key being based on a unique identifier of the mapped state and the one or more input symbols to be received.

Preferably, a subset of the one or more of the input symbols to be received, by the pattern matching in use, is excluded from one or more input symbols used to determine the key.

Preferably, the excluded input symbols are input symbols corresponding to wildcard pattern symbols of one or more of the new states.

Preferably, the pattern matching machine generator further comprises an output function generator component adapted to provide an output function for selected states in the state machine, the selected states being states representing a pattern symbol sequence corresponding to one or more matched patterns.

Preferably, the pattern matching machine is generated as a software component for execution in a computer system.

The present invention accordingly provides, in a sixth aspect, a pattern matching machine generated by the pattern matching machine generator described above, the pattern matching machine being adapted to match a plurality of symbol patterns in a sequence of input symbols, where at least one symbol pattern includes a wildcard symbol, wherein the pattern matching machine is executable so as to trigger an output function component of the pattern matching machine for sub-sequences of symbols in the sequence of input symbols matching one or more symbol patterns.

The present invention accordingly provides, in a seventh aspect, a computer program element comprising computer program code to, when loaded into a computer system and executed thereon, cause the computer to perform the steps of a method as described above.

BRIEF DESCRIPTION OF THE DRAWINGS

Embodiments of the present invention will now be described, by way of example only, with reference to the accompanying drawings, in which:

FIGS. 18a to 18d show the operation of the Find_Failure_States algorithm in accordance with an exemplary embodiment of the present invention;

FIG. 24 is a schematic illustration of a pattern matching machine generator for generating a pattern matching machine in accordance with an embodiment of the present invention;

FIGS. 25a to 25h show the operation of the Generate_deterministic_variants algorithm in accordance with an exemplary embodiment of the present invention.

DETAILED DESCRIPTION OF THE EMBODIMENTS

Figure 1:
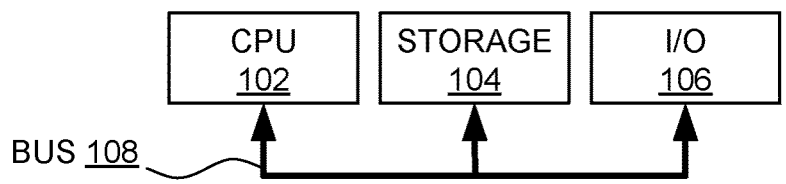
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
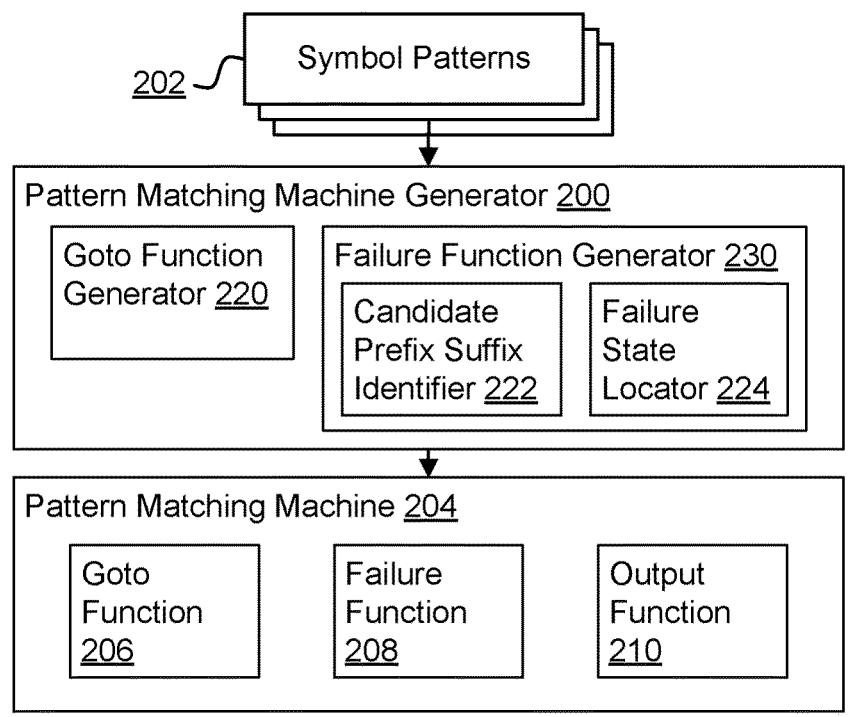
FIG. 2 is a schematic illustration of a pattern matching machine generator for generating a pattern matching machine in accordance with an embodiment of the present invention.

FIG. 2 is a schematic illustration of a pattern matching machine generator 200 for generating a pattern matching machine 204 in accordance with an embodiment of the present invention. The pattern matching machine generator 200 is a hardware or software component suitable for receiving a plurality of symbol patterns 202 including symbols from a symbol alphabet Σ and additionally metacharacters representing wildcards. A wildcard metacharacter serves to indicate any character in the symbol alphabet Σ. For example, a wildcard metacharacter can be represented as the symbol '.' as specified in the POSIX (Portable Operating System Interface) Basic Regular Expression syntax (BRE) according to IEEE Standard 1003.1 (2004). The pattern matching machine generator 200 is adapted to generate a pattern matching machine 204 as a hardware or software component for identifying matches of one or more of the plurality of symbol patterns 202 by an input symbol sequence. Some of the features of the pattern matching machine 204 of FIG. 2 are similar to those described in the Aho-Corasick paper referenced above, and additionally the pattern matching machine 204, and the pattern matching machine generator 200, are considerably adapted to advantageously provide support for wildcard metacharacters. In this way the pattern matching machine 204 in embodiments of the present invention provides the advantages of the Aho-Corasick approach to symbol pattern matching while additionally accommodating the indeterminate nature of patterns including wildcard metacharacters.

The pattern matching machine 204 includes a goto function 206, a failure function 208 and an output function 210. While these functions are illustrated and described as discrete and separate functions it will be appreciated by those skilled in the art that many and various aspects of each of these functions can be further subdivided or combined into additional or consolidated functions. The goto function 206 serves a similar purpose to the goto function of the Aho- Corasick paper in that it maps a pair consisting of a state and an input symbol to a state or fail. However, the goto function 206 of the present invention is considerably improved over that of the Aho-Corasick approach to support wildcard metacharacters in symbol patterns as described in detail below. The failure function 208 serves a similar purpose to the failure function of the Aho-Corasick paper in that it maps a state to a state and is consulted when the goto function reports fail. However, the failure function 208 of the present invention is considerably improved over that of the Aho-Corasick approach to map a state to potentially numerous states, taking account of wildcard metacharacters in symbol patterns and symbols received in input symbol sequences as described in detail below. The output function 210 serves a similar purpose to the output function of the Aho-Corasick paper in that it outputs matching symbol sequences occurring in an input symbol sequence as part of the operation of the pattern matching machine 204. However, the output function 210 of the present invention is considerably improved over that of the Aho-Corasick approach to accommodate wildcard metacharacters in symbol patterns as described in detail below.

The pattern matching machine generator 200 is adapted to generate the goto function 206, failure function 208 and output function 210 of the pattern matching machine 204. The goto function 206 is generated by way of the goto function generator 220 using an algorithm such as algorithm 1 described in detail below. The failure function 208 is generated by way of a failure function generator component 230 including a candidate prefix suffix identifier 222, described in detail below with respect to FIG. 11, and a failure state locator 224, using an algorithm such as algorithm 2 described in detail below. The output function 210 is generated partly by the goto function generator 220, and partly implemented by way of an output algorithm such as algorithm 4 described in detail below. While the components 220, 230, 222 and 224 are illustrated as separate components, it will be appreciated by those skilled in the art in view of the teachings herein that these components could be combined or further subdivided, or provided as facilities or services of components external to the pattern matching machine generator 200.

Figure 3:
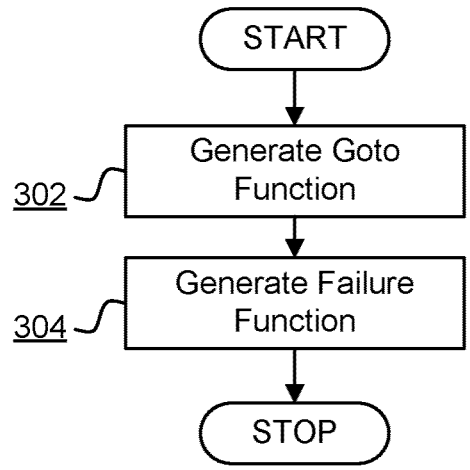
FIG. 3 is a flowchart of a method of the pattern matching machine generator of FIG. 2 in accordance with an embodiment of the present invention.

FIG. 3 is a flowchart of a method of the pattern matching machine generator 200 of FIG. 2 in accordance with an embodiment of the present invention. The pattern matching machine generator 200 generally performs the steps of: generating the goto function 302; and generating the failure function 304. The output function 210 is generated, in part, along with the generation of the goto function 206. The output function 210 is finalised at a runtime of the pattern matching machine 204 in use by way of an algorithm described in detail below.

In the present embodiment, the goto function 206 is generated using an algorithm such as the "Generate_goto_function" algorithm listed in Algorithm 1 and described in detail below. For ease of representation, and consistent with the Aho-Corasick paper, the goto function 206 is considered a directed graph state machine or automaton of states with directed transitions between states representing the set of symbol patterns 202. Thus, in use, the pattern matching machine 204 enters a particular state in the directed graph only when all transitions from a start state (an initial state) to the particular state are occasioned by input symbols received in an input symbol sequence. Accordingly, each state can be thought of as representing a received prefix of a symbol pattern 202, which can include all of the symbol pattern 202. Further, each transition can be thought of as corresponding to a particular symbol in a symbol alphabet Σ, or alternatively, a metacharacter such as a wildcard metacharacter.

Figure 4:
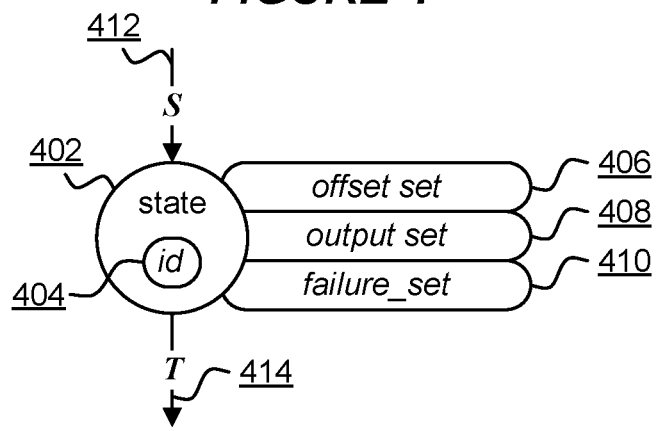
FIG. 4 is a conceptual diagram of a state of the pattern matching machine of FIG. 2 in accordance with an embodiment of the present invention.

FIG. 4 is a conceptual diagram of a single state 402 of the pattern matching machine 204 of FIG. 2 in accordance with an embodiment of the present invention. In one embodiment, each state 402 can be implemented as a state data structure. In an alternative embodiment, each state 402 can be implemented as an instance of a state class in an object oriented programming environment. Alternatively, the states of the pattern matching machine 204 can be implemented otherwise than by way of data structures, such as by a lookup, mapping or hashtable, or by algorithmically generated dynamic software components determined at runtime. The state 204 includes an identifier, 404, that is unique within a directed graph of the pattern matching machine 204. The state has associated a directed transition 412 leading to the state, and a directed transition 414 leading from the state. Each of the directed transitions 412, 414 has associated a symbol, 'S' and 'T' respectively. In use, the pattern matching machine 204 effects a transition 412 to state 402 from a preceding state if a symbol 'S' is received from an input symbol sequence. Thus the transition 412 can be thought of as corresponding to the receipt of a symbol 'S' from the input symbol sequence when the pattern matching machine 204 is in the preceding state. Further, state 402 can be thought of as a state representing the receipt of pattern symbol 'S', or more simply put, a state representing pattern symbol 'S' (and, indeed, any pattern symbols for transitions preceding transition 412). Similarly, in use, the pattern matching machine 204 effects a transition 414 from state 402 to a subsequent state if a symbol 'T' is received from the input symbol sequence. Thus the transition 414 can be thought of as corresponding to the receipt of a symbol 'T' from the input symbol sequence when the pattern matching machine 204 is in state 402. Further, such a subsequent state to which transition 414 leads can be thought of as a state representing the receipt of pattern symbols 'ST', or more simply put, a state representing pattern symbols 'ST' (and, indeed, any pattern symbols for transitions preceding transition 412).

It will be appreciated that not all states have a directed transition 414 leading from the state. States constituting an end state of the directed graph may not include an outgoing transition 414. Further, in some embodiments, a start state may not include a directed transition leading to the state. For example, a directed graph of a pattern matching machine 204 where a transition exists from the start state for every symbol in a symbol alphabet Σ may not require a directed transition leading to the start state.

The state 402 has further associated a set of offsets 406, a set of output symbol sequences 408, and a set of failure state mappings 410. In alternative embodiments, any or all of the elements 406, 408 and 410 can be implemented differently so as not to require that they are directly included or stored with, in, or in association with, state 402, such as by being determined algorithmically by the pattern matching machine 204 in use, or by being stored separately to, but in respect of, the state 402, such as by way of a mapping, lookup table, database, hash table or the like.

The set of offsets 406 is a set of zero or more numerical offset values. Each offset in the set of offsets 406 indicates a relative location, in an input symbol sequence received by the pattern matching machine 204 in use, to a symbol having been received in the input symbol sequence. In particular, the offsets indicate symbols used to effect a transition between states in the pattern matching machine 204 where the transition corresponds to a wildcard symbol. Thus, each state stores, in the set of offsets 406, the locations of all symbols received in an input symbol sequence corresponding to wildcards in all search patterns of which the state 402 is a part. In the present embodiment, such locations are stored as relative offsets from a most recently received symbol and the offset values are stored for each state when, or after, each state is created for the pattern matching machine 204 as will be described in detail below with respect to Algorithm 1. Thus, if transition 412 were amended to correspond to a wildcard metacharacter, such as '.', then the set of offsets 406 would include an offset of zero to indicate, at a runtime of the pattern matching machine 204, that, when the state machine is in state 402, a most recently received input symbol constitutes a wildcard metacharacter of transition 412 in a symbol pattern. A state immediately subsequent to state 402 would also include an offset in its associated set of offsets 406, incremented to one, to indicate that, at a runtime of the pattern matching machine 204 in a state immediately subsequent to state 402, an input symbol received one symbol before the most recent symbol constitutes the metacharacter of transition 412 in a symbol pattern. It can be seen that the set of offsets 406 is populated with an offset for each state subsequent to a transition corresponding to a wildcard metacharacter in a symbol pattern.

The set of output symbol sequences 408 is a set of zero or more symbol sequences corresponding to complete symbol patterns 202. A state that is arrived at in response to the receipt of an input symbol corresponding to a last symbol in a complete symbol pattern 202 will include the corresponding symbol pattern 202 in its associated set of output symbol sequences 408. The output symbol sequences 408 constitute only part of the output function 210 of the pattern matching machine 204 since output symbol sequences 408 associated with other states to which a state is mapped by a failure function may also be occasioned for a particular input symbol sequence as will be described in detail below.

The set of failure state mappings 410, failure_set, is a set of failure mappings for the state 402 that is used by the failure function 208 to map the state 402 to another state in the event that the goto function 206, executed at a runtime of the pattern matching machine 204 in the state 402, reports fail for a received input symbol. That is to say, when no directed transition exists from the state 402 for an input symbol, the failure function uses the set of failure state mappings 410 to identify an alternative state, a failure state, to which the pattern matching machine 204 can transition, if such a failure state exists. As is the case using the Aho-Corasick approach, a state to which the pattern matching machine 204 transitions in response to the failure function 208 corresponds to a proper suffix of the symbol pattern matched, or partly matched, by the current state 402. That is to say, the current state 402 can be considered to constitute a state of matching, or partially matching, a symbol pattern and, where the goto function 206 indicates fail for an input symbol, a failure state identified by the failure function 208 will correspond to a state of matching, or partially matching, a proper suffix of the matched, or partially matched, symbol pattern. Notably, the current state 402 can be said to correspond to a match of a prefix of the symbol pattern, which can include the entirety of the symbol pattern. Thus, a failure state identified by the failure function 208 will correspond to a state matching a proper suffix of the prefix of the symbol pattern represented by a current state. The definition of the set of failure state mappings 410, and its use in the failure function 208, are considered in detail below.

The generation of the goto function 206 will now be considered in detail with reference to Algorithm 1 "Generate_goto_function". The Generate_goto_function algorithm accepts, as input, a set of symbol patterns 202 $\{y_1 \ldots y_k\}$ and returns a goto function g 206. As previously described, the goto function g 206 can be thought of as a directed graph data structure.

```
1   Algorithm 1: Generate_goto_function
2   Input: set of symbol patterns K = {y₁...yₖ}
3   Output: goto function g
4   begin
5       start_state ← new( State )
6       start_state.offsets ← { }; start_state.output ← { }
7       for i ← 1 until k do enter( yᵢ )
8       if g(start_state, wildcard) ≠ fail then
9       begin
10          for all a such that g(start_state, a) = fail do g(start_state,
            a) ← 0
11      end
12  end
13
14  procedure enter(a₁ ... aₘ)
15  begin
16      state ← start_state; j ← 1
17      while g(state, aⱼ) ≠ fail do
18      begin
19          state ← g(state, aⱼ)
20          j ← j + 1
21      end
22      for p ← j until m do
23      begin
24          newstate ← new ( State )
25          g(state, aₚ) ← newstate
26          newstate.offset ← { }; newstate.output ← { }
27          for each offset, Oₛ, in ordered set state.offset do
28          begin
29              Oₛ ← Oₛ + 1
30              newstate.offset = newstate.offset ∪ Oₛ
31          end
32          if aₚ = wildcard then newstate.offset ← newstate.offset ∪ 0
33          state ← newstate
34      end
35      state.output ← {a₁ ... aₘ}
36  end
```

Considering Algorithm 1, initially the algorithm generates a new state as a start state at line 5. The start state is a state at which the pattern matching machine 204 starts searching for symbol sequences matching symbol patterns 202 in an input symbol sequence. All other states will exist along one or more directed transitions, at least some of which transition from the start state. At line 6 the algorithm initialises a set of offsets 406 and a set of output symbol sequences 408 for the start state. At line 7 the algorithm executes a procedure named enter for each of the symbol patterns 202 in the input set $\{y_1 \ldots y_k\}$.

The procedure enter is defined from line 14 and receives, as input, a single symbol pattern as a sequence of symbols $\{a_1 \ldots a_m\}$. Initially, at line 16, the procedure sets a variable, state, representing a current state, to the start state of the state graph (the start state being instantiated at line 5). A counter, j, is then initialised. By way of a loop at lines 17 to 21, the procedure then traverses the directed state graph for symbols in the symbol pattern $\{a_1 \ldots a_m\}$. The loop seeks to transition from the current state, state, to a subsequent state based on the goto function g 206, (insofar as the goto function is already defined). Thus, the loop at lines 17 to 21 traverses the directed state graph, to the extent that it is already defined, until it is unable to transition to a state for a current symbol $a_j$. In this way, the loop reuses states and transitions between states already existing in the directed state graph for the symbol pattern $\{a_1 \ldots a_m\}$. When the state graph traversal fails for a current symbol $a_j$, the procedure enters a second loop, from line 22, through each of the remaining symbols in the symbol pattern $a_j$ to $a_m$. For each remaining symbol, the procedure generates a new state, newstate, (line 24) and defines a new transition in the goto function g 206 from the current state, state, to newstate (line 25). Thus, line 25 constitutes the generation of a new transition from state to newstate for the pattern symbol $a_p$. The procedure initialises a set of offsets 406 and a set of output symbol sequences 408 for newstate at line 26.

Lines 27 to 31 serve to copy a set of offsets 406 from the current state state to the new state newstate, incrementing each offset by 1. The newstate constitutes a state subsequent to state in the directed graph, and any wildcard transition leading to state, and having a respective offset value in the set of offsets 406 for state, will apply equally to newstate. Such offset values will, however, need to be incremented to account for the additional pattern symbol $a_p$ corresponding to the new transition to newstate.

At line 32 the procedure tests if the transition leading to newstate corresponds to a wildcard symbol by checking if $a_p$ is a wildcard. If $a_p$ is a wildcard then the set of offsets 406 is supplemented by a new offset of value zero to represent the new transition leading to newstate that corresponds to a wildcard symbol in $a_p$.

At line 33 newstate is made the current state, state, and the loop is repeated. On completion of the loop of lines 22 to 34 for all symbols in the symbol pattern $\{a_1 \ldots a_m\}$, the current state, state, constitutes the state at which the entire symbol pattern $\{a_1 \ldots a_m\}$ is determined to have been matched. Accordingly, the output function 210 for state is set to the symbol pattern $\{a_1 \ldots a_m\}$.

Returning to the loop at line 7 of Agorithm 1, on completion of the enter procedure for each of the symbol patterns $\{y1 \ldots yk\}$ the algorithm proceeds to line 8 where it checks, using the goto function g 206, for the absence of a wildcard transition from the start state. In the absence of a wildcard transition, a looped transition is generated at line 10 directed from and to the start state and corresponding to all symbols for which there is not already a transition from the start state. This technique of looping a transition to the start state is consistent with that known from the Aho-Corasick approach.

One aspect of the goto function g 206, that is not represented in Algorithm 1, addresses the issue of precedence of transitions in the directed state graph. Where a first state leads to a plurality of second states via a set of transitions, the set of transitions including one or more transitions corresponding to literal symbols and a transition corresponding to a wildcard symbol, the goto function g 206 needs to be able to determine which transition is appropriate for an input symbol matching a literal transition: should the goto function g 206 use the literal transition or the wildcard transition? In accordance with embodiments of the present invention, the goto function g 206 is adapted to always ensure the literal transition takes precedence. However, states arising subsequent to the wildcard state may not arise subsequent to the literal state, and so pattern matching may not be accurate. To overcome this problem, post-processing can be performed to adapt the goto function g 206 to copy all states and transitions that occur subsequent to a wildcard transition to also occur subsequent to all literal transitions that originate from the same state as the wildcard transition. In this way, all states that the pattern matching machine 204 could enter via a wildcard transition can also be entered by following a literal transition, so ensuring effectiveness of the pattern matching machine 204 in which the goto function g 206 enforces precedence of literal transitions over wildcard transitions. While the embodiment described here involves post-processing to adapt the got function g 206 to provide this facility, it will be apparent to those skilled in the art, in view of the teachings herein, that an adapted algorithm for the generation of the goto function g 206 could alternatively be employed to provide the necessary duplication of states and transitions arising subsequent to a wildcard state without the need for such post-processing.

The approach of Algorithm 1 will now be considered in use in accordance with an embodiment of the present invention for the following first set of exemplary symbol patterns, where the '.' metacharacter constitutes a wildcard:

AC.NF
BNF.P
CA
CBNF.X
DE..LM
E.KLM

Figure 5:
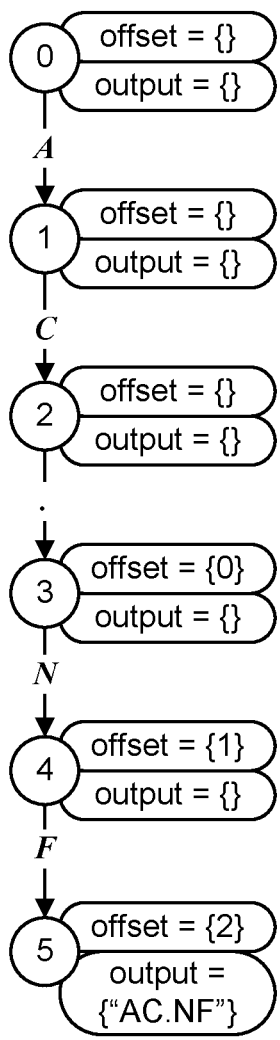
FIGS. 5 to 8 illustrate partly generated goto functions for a pattern matching machine in accordance with an embodiment of the present invention.

FIGS. 5 to 8 illustrate the evolution of a partly generated goto function g 206 for a pattern matching machine 204 in accordance with an embodiment of the present invention. FIG. 5 illustrates the result of the Generate_goto_function after processing the first symbol pattern 'AC.NF'. As can be seen in FIG. 5, a directed graph of states from a start state '0' to a state '5' is generated, with transitions between states corresponding to the symbols in the symbol pattern. The set of offsets 406 is an empty set for each of the states '0', '1' and '2' preceding the wildcard transition. Subsequent to the wildcard transition, from state '3', the offset of the wildcard transition is included in the set of offsets 460. Specifically, in association with state '3', the offset of the wildcard transition has a value of zero since the wildcard transition occurs immediately before state '3' (leading to state '3'). In association with state '4', the offset of the wildcard transition has a value of one since the wildcard transition occurs one transition before the transition immediately before state '4'. In association with state '5', the offset of the wildcard transition has a value of two since the wildcard transition occurs two transitions before the transition immediately before state '5'.

The set of output symbol sequences 408 is an empty set for each of the states '0' to '4' because none of these states represent a state in which a complete match of the symbol pattern will have occurred. State '5', however, constitutes a state in which a complete match of the symbol pattern 'AC.NF' will have occurred and, accordingly, the complete symbol pattern is comprised in the set of output symbol sequences 408 for state '5'. Notably, the set of output symbol sequences 408 does not necessarily constitute the total set of output symbol sequences for a state at this stage, since additional output symbol sequences may be output based on failure mappings for a state. Such additional output symbol sequences are determined at a runtime of the pattern matching machine 204 since they are dependent on the symbols received in an input symbol sequence and the failure mappings, as is described in detail below.

Figure 6:
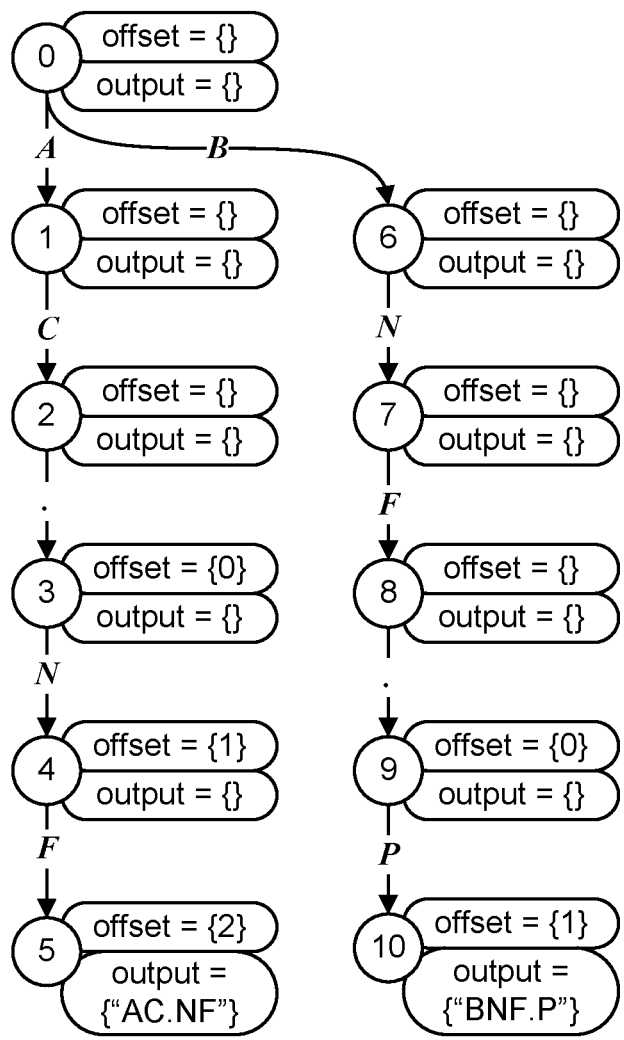

FIG. 6 illustrates the result of the Generate_goto_function after processing the first and second symbol patterns 'AC.NF' and 'BNF.P'. Note the values of offset stored in the set of offsets 406 for states '9' and '10' corresponding to the wildcard transition between states '8' and '9'. Notice also the inclusion of the complete symbol pattern 'BNF.P' in the output function of only state '10', corresponding to the only state in which this pattern will be completely matched.

Figure 7:
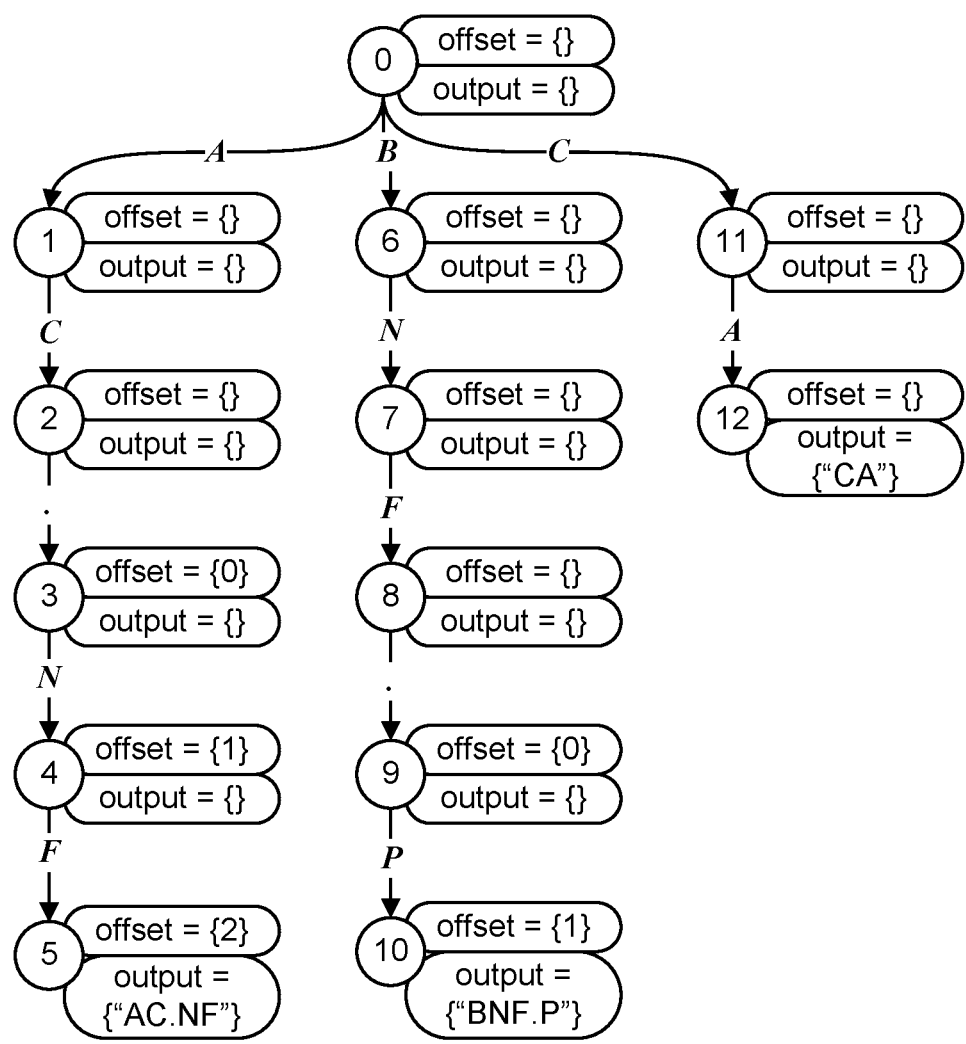
Figure 8:
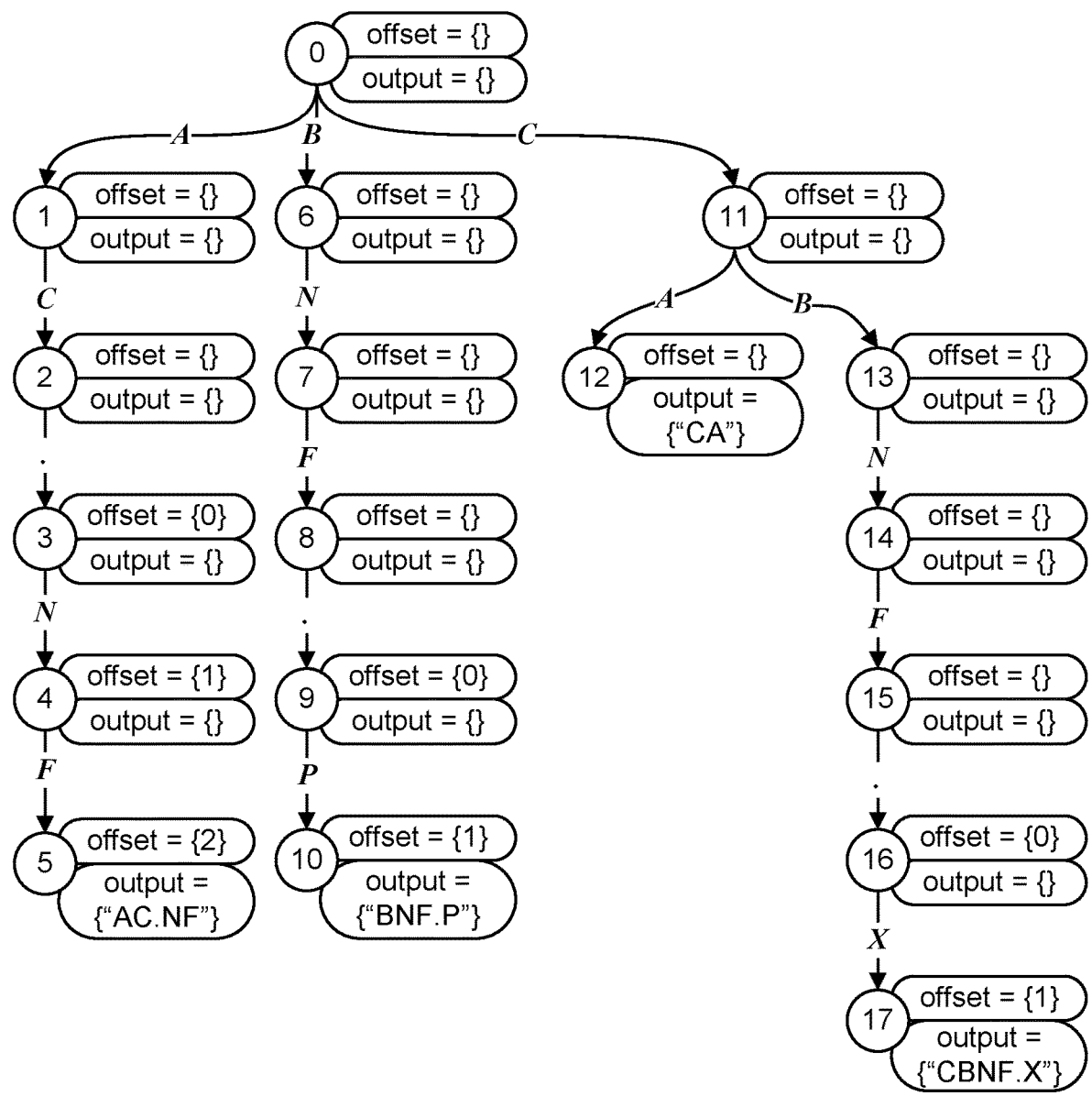

FIG. 7 illustrates the result of the Generate_goto_function after processing the first to third symbol patterns 'AC.NF', 'BNF.P' and 'CA'. FIG. 8 illustrates the result of the Generate_goto_function after processing the first to fourth symbol patterns 'AC.NF', 'BNF.P', 'CA' and 'CBNF.X'. Notice, in FIG. 8, the reuse of state '11' for both the 'CA' and 'CBNF.X' symbol patterns arising from the while loop at lines 17 to 21 of Algorithm 1.

Figure 9:
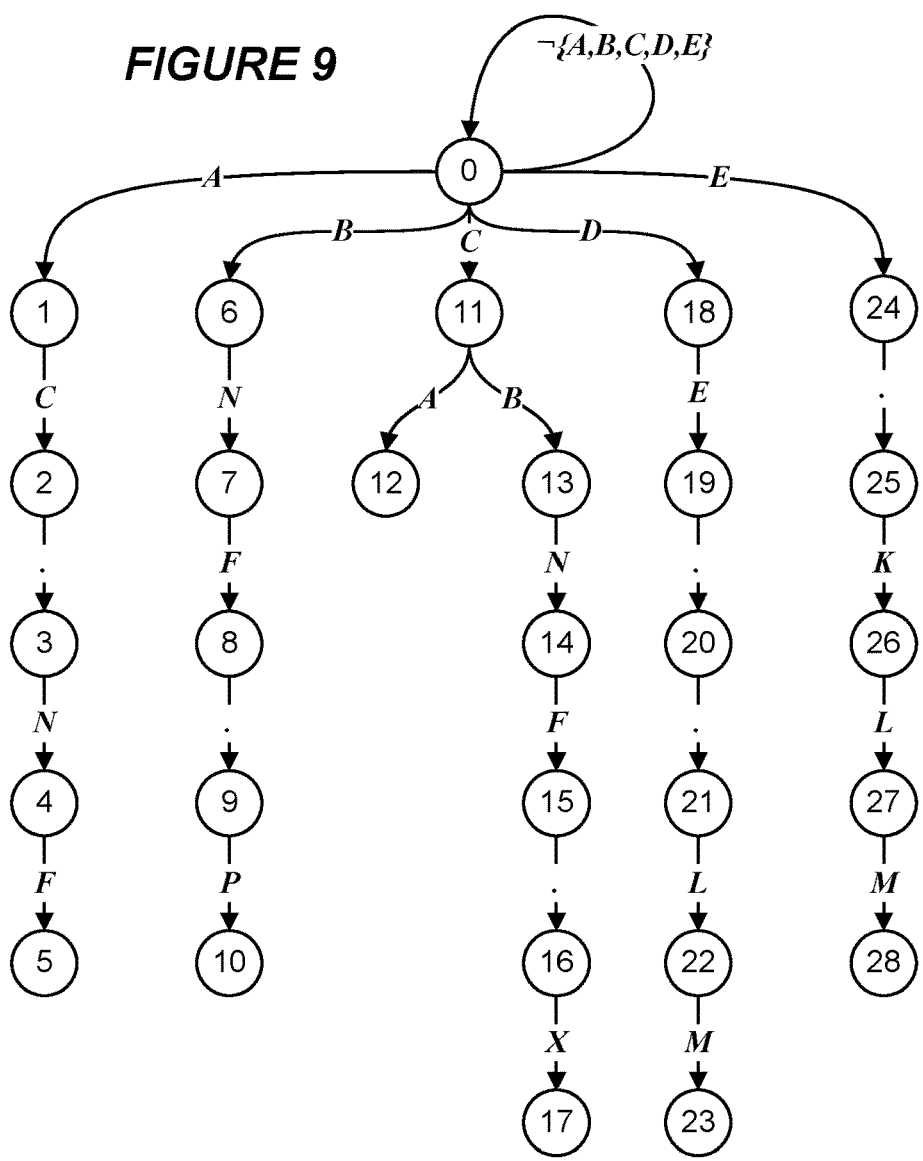
FIG. 9 depicts a state graph of a pattern matching machine in accordance with an embodiment of the present invention.

FIG. 9 depicts a state graph of a pattern matching machine 204 in accordance with an embodiment of the present invention. The state graph of FIG. 9 corresponds to the result of the Generate_goto_function after processing all six of the first exemplary symbol patterns. FIG. 9 does not indicate the set of offsets 406 or the set of output symbol sequences 408 for each state for simplicity. Thus, on completion of the Generate_goto_function, the directed graph of FIG. 9 constitutes, at least in part, the goto function g 206 for the first exemplary symbol patterns.

According to the Aho-Corasick approach, a failure function is responsive to a fail condition of the goto function g 206 and maps a current state of the directed graph, in use, to a new state. In Aho-Corasick, the new state is identified as a state corresponding to a longest proper suffix of the pattern symbol sequence of the mapped state, where such a state exists. The Aho-Corasick approach assumes a literal identity between all symbols received in an input symbol sequence and symbols corresponding to transitions between states leading to a current state. This assumption holds, in Aho-Corasick, since the transitions, in Aho-Corasick, always correspond to determinate symbols i.e. symbols that are known at the point of generating the goto and failure functions of a pattern matching machine, because the symbols are always literal symbols. However, in accordance with embodiments of the present invention, transitions can correspond to wildcard metacharacters, the value of which is not determinate at the point of generating the goto and failure functions, and the assumption is no longer valid.

Accordingly, embodiments of the present invention provide for supplementing failure function mappings from a first state to a second state with additional logic to account for the potentially variable values of input symbols received, by the pattern matching machine 204 in use, to constitute a wildcard symbol in a symbol pattern represented, at least in part, by a current state of the machine 204. An improved failure function 208 is therefore provided in accordance with embodiments of the present invention. In particular, the failure function 208 provides a set of zero or more failure state mappings 410 for states in the directed graph of the pattern matching machine 204.

Figure 10:
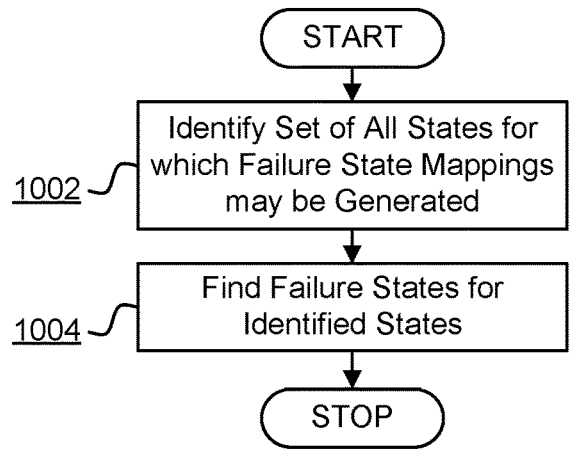
FIG. 10 is a flowchart of the generate failure function of FIG. 3 in accordance with an embodiment of the present invention.

FIG. 10 is a flowchart of the generate failure function 304 of FIG. 3 in accordance with an embodiment of the present invention. The generate failure function 304 includes an identification, at step 1002, of a set of all states in a directed graph for a pattern matching machine 204 for which failure state mappings may be generated. Subsequently, at step 1004, the generate failure function 304 finds failure states for each of the states identified at step 1002.

The identification, at step 1002, of states for which failure state mappings may be generated is informed by certain novel principles realised by the inventors that apply to directed state graphs representing symbol patterns including wildcards. Firstly, states in a directed state graph from which transitions corresponding to wildcard symbols originate, can never be eligible for a failure mapping. This is because a goto function 206 can never return fail for symbols received by a machine 204 in such states since any input symbol will always at least follow the transition corresponding to the wildcard pattern symbol. Secondly, each of one or more failure state mappings 410 must include a condition based on symbols in an input symbol sequence, the satisfaction of which identifies a particular failure state mapping appropriate for the particular input symbol sequence, if such a mapping exists. Thirdly, an output function for each state must consider also failure state mappings 410 and provide output, where appropriate, of one or more failure states based on symbols in an input symbol sequence constituting wildcard symbols in a symbol pattern.

Optionally, the set of failure state mappings 410 can be omitted for states determined to be exempt from failure state mapping. In this way, storage and other resources consumed by the pattern matching machine 204 can be reduced. For example, in use, a pattern matching machine 204 may assume that a failure state for a state having no explicit failure state mapping is always determined to be a start state of a state machine.

The identification step 1002 is carried out by the candidate prefix suffix identifier 222 of the pattern matching machine 200. The locating step 1004 is carried out by the failure state locator 224 of the pattern matching machine 200.

Figure 11:
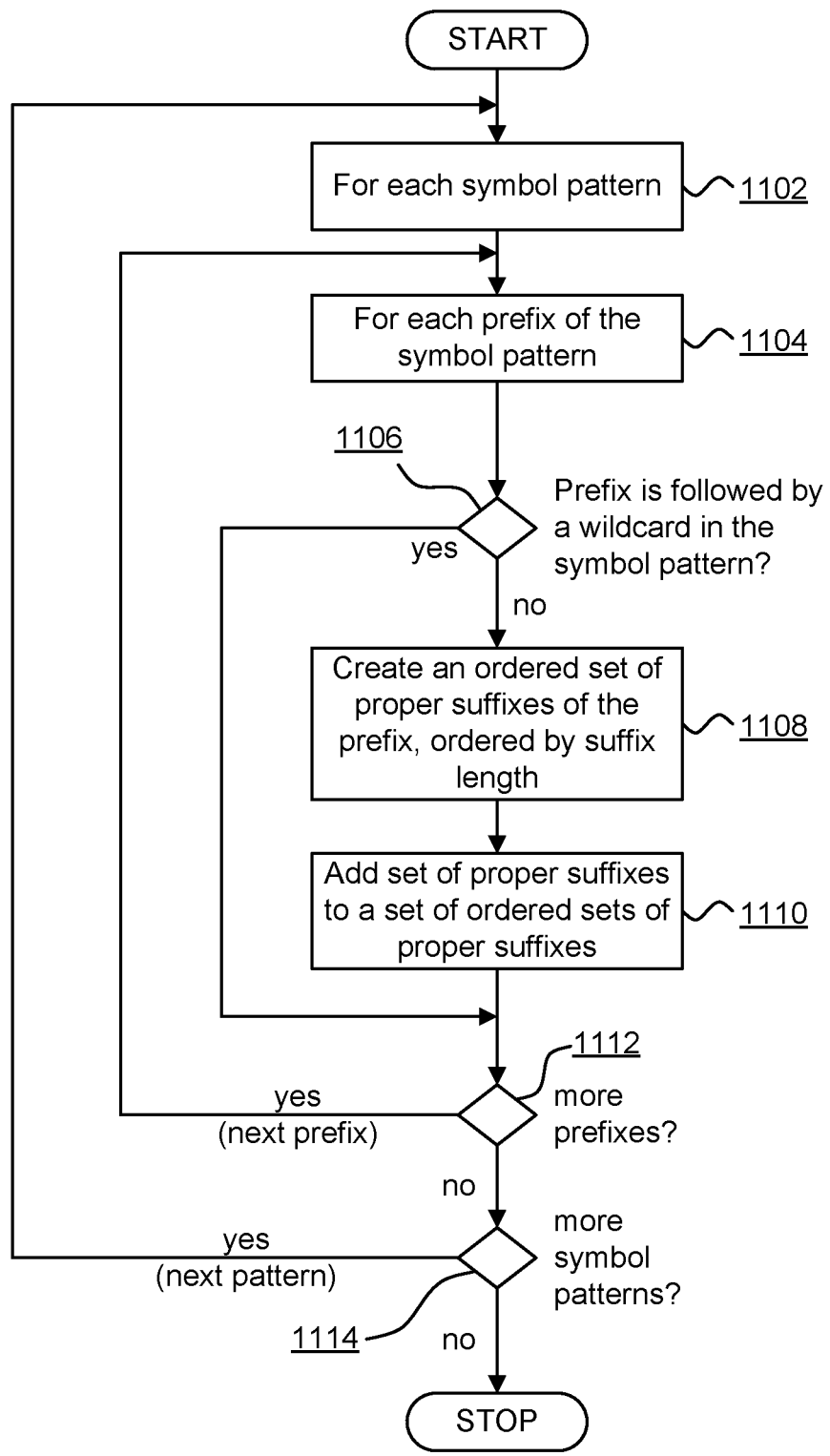
FIG. 11 is a flowchart of the identification step of the flowchart of FIG. 10 in accordance with an embodiment of the present invention.

FIG. 11 is a flowchart of the identification step 1002 of the flowchart of FIG. 10 in accordance with an embodiment of the present invention. Initially, at step 1102, the method commences an iteration through each of the symbol patterns 202. At step 1104, the method commences a nested iteration through each prefix of a current symbol pattern. At step 1106 the method determines if the current symbol pattern prefix is followed by a wildcard. In this way the condition described above, that states from which transitions corresponding to wildcard symbols originate are not eligible for failure mapping, can be enforced. If the prefix is determined to be followed by a wildcard in the symbol pattern the method skips to step 1112. Alternatively, the method proceeds to step 1108 at which an ordered set of proper suffixes of the current prefix is created, the set being ordered by suffix length. At step 1110 the ordered set of proper suffixes is added to a set of ordered sets of proper suffixes for the current symbol pattern. At step 1112 the method determines if more prefixes are to be processed and iterates to step 1104 in the affirmative. At step 1114 the method determines if more symbol patterns are to be processed and iterates to step 1102 in the affirmative.

Figure 12:
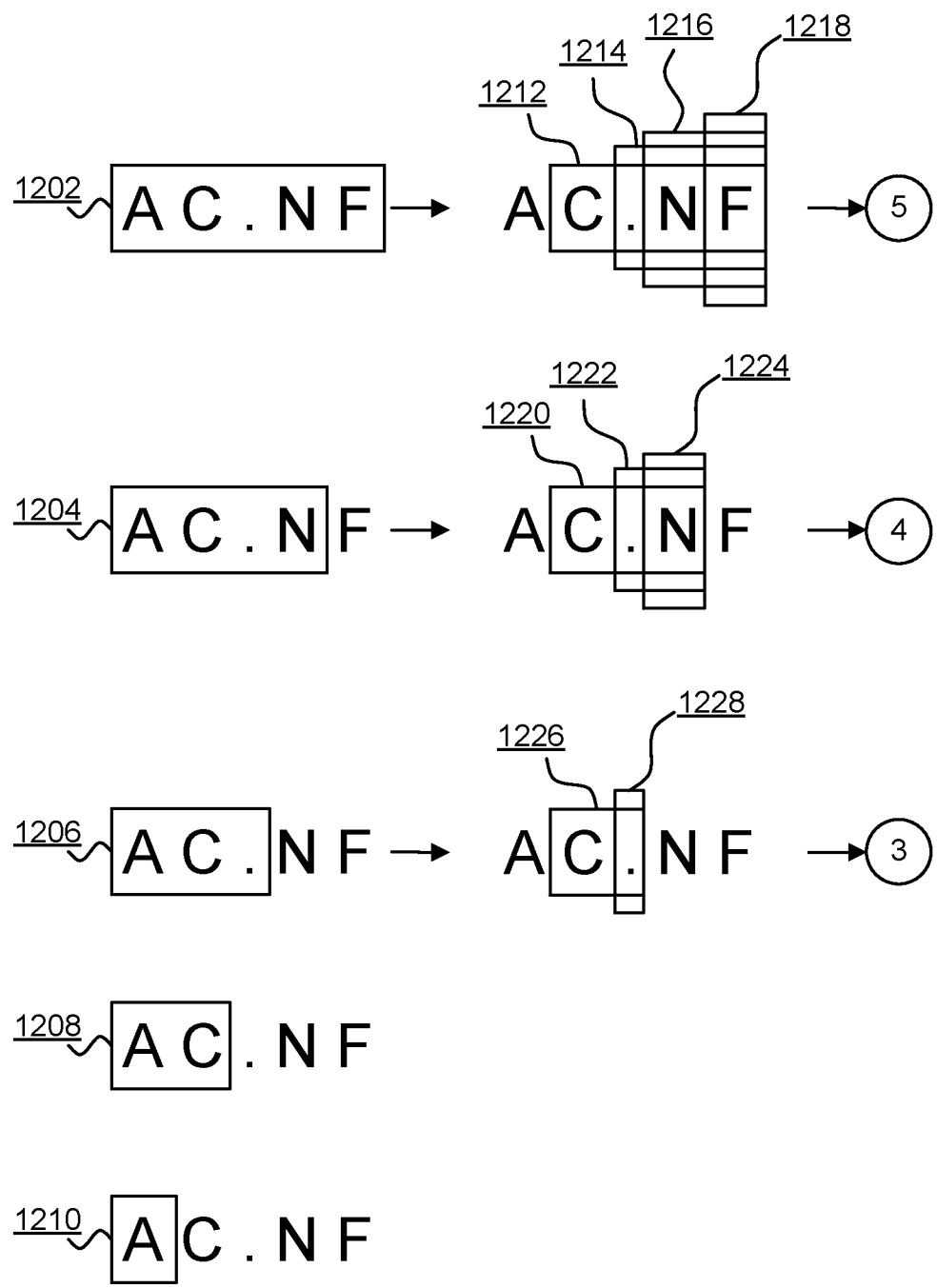
FIGS. 12 to 15 depict the method of the flowchart of FIG. 11 in use in accordance with an embodiment of the present invention.

Thus, on completion of the method of FIG. 11, a set is generated, for each of the symbol patterns 202 for the pattern matching machine 204, of ordered sets of proper suffixes of prefixes of the symbol pattern. This is illustrated with reference to the first exemplary symbol patterns and FIGS. 12 to 15. FIG. 12 illustrates the method of FIG. 11 applied, at step 1102, to the first exemplary symbol pattern 'AC.NF'. It is first assumed that a set of ordered sets of proper suffixes for the current symbol pattern is initialised to an empty set { }. Step 1104 iterates through each prefix of the current symbol pattern 'AC.NF'. The prefixes of 'AC.NF' are indicated in FIG. 12 as: 'AC.NF' 1202, represented by state '5' in the state graph of FIG. 9; 'AC.N' 1204, represented by state '4' in the state graph of FIG. 9; 'AC.' 1206, represented by state '3' in the state graph of FIG. 9; 'AC' 1208, represented by state '2' in the state graph of FIG. 9; and 'A' 1210, represented by state '1' in the state graph of FIG. 9.

For the first prefix 'AC.NF' 1202, the method determines, at step 1106, that the first prefix is not followed by a wildcard symbol, and so the prefix is eligible for generating a set of failure state mappings 410. Subsequently, at step 1108, the method creates an ordered set of proper suffixes of the current prefix, ordered by suffix length. FIG. 12 illustrates the set of proper suffixes of the current prefix 'AC.NF' 1202.

The set of proper suffixes includes 'C.NF' 1212; '.NF' 1214; 'NF' 1216; and 'F' 1218. Each of these proper suffixes corresponds to state '5' in the state graph (FIG. 9), since it is state '5' that represents the first prefix 'AC.NF' 1202. Thus state '5' is a state for which a set of failure mappings can be subsequently generated as will be described in detail below. Thus, the ordered set of proper suffixes PS for state '5' is given by:

$PS_5$={'C.NF', '.NF', 'NF', 'F'}

This ordered set of proper suffixes is added to the set of ordered sets SOS of proper suffixes at step 1110:

$SOS_{AC.NF}$={{'C.NF', '.NF', 'NF', 'F'}}

Subsequently, the method returns to step 1102 for the next prefix, 'AC.N' 1204 represented by state '4' in the state graph of FIG. 9. As illustrated in FIG. 12, the prefix 'AC.N' 1204 has proper suffixes 'C.N' 1220; '.N' 1222; and 'N' 1224. Thus each of these proper suffixes corresponds to state '4' since it is state '4' that represents the prefix 'AC.N' 1204. Thus, the ordered set of proper suffixes PS for state '4' is given by:

$PS_4$={'C.N', '.N', 'N'}

This ordered set of proper suffixes is added to the set of ordered sets SOS of proper suffixes at step 1110:

$SOS_{AC.NF}$={{'C.NF', '.NF', 'NF', 'F'}, {'C.N', '.N', 'N'}}

Subsequently, the method returns to step 1102 for the next prefix, 'AC.' 1206 represented by state '3' in the state graph of FIG. 9. As illustrated in FIG. 12, the prefix 'AC.' 1206 has proper suffixes '.N' 1226; and '.' 1228. Thus each of these proper suffixes corresponds to state '3' since it is state '3' that represents the prefix 'AC.' 1206. Thus, the ordered set of proper suffixes PS for state '3' is given by:

$PS_3$={'C.', '.'}

This ordered set of proper suffixes is added to the set of ordered sets SOS of proper suffixes at step 1110:

$SOS_{AC.NF}$={{'C.NF', '.NF', 'NF', 'F'}, {'C.N', '.N', 'N'}, {'C.', '.'}}

Subsequently, the method returns to step 1102 for the next prefix, 'AC' 1208 represented by state '2' in the state graph of FIG. 9. The prefix 'AC' 1208 is determined to be followed by the wildcard metacharacter '.' at step 1106 since there exists a transition from state '2' corresponding to a wildcard symbol. Accordingly, the method skips to step 1112.

Subsequently, the method returns to step 1102 for the next prefix, 'A' 1210 represented by state '1' in the state graph of FIG. 9. The prefix 'A' 1210 has no proper suffixes and so the ordered set of proper suffixes generated at step 1108 is an empty set. Preferably a test is included in the method of FIG. 11 to either detect single symbol prefixes or empty suffix sets to avoid unnecessary processing of steps 1106 through 1110.

Thus, following the execution of the nested loop of steps 1104 to 1112 for the symbol pattern 'AC.NF', the set of ordered sets SOS of proper suffixes for the symbol pattern is determined to be:

$SOS_{AC.NF}$={{'C.NF', '.NF', 'NF', 'F'}, {'C.N', '.N', 'N'}, {'C.', '.'}}

The method of FIG. 11 iterates for all symbol patterns. With further reference to the exemplary symbol patterns above, FIGS. 13 and 14 illustrate the method of FIG. 11 applied, at step 1102, to each of the second exemplary symbol pattern 'BNF.P' and the third exemplary symbol pattern 'CA' respectively.

Figure 13:
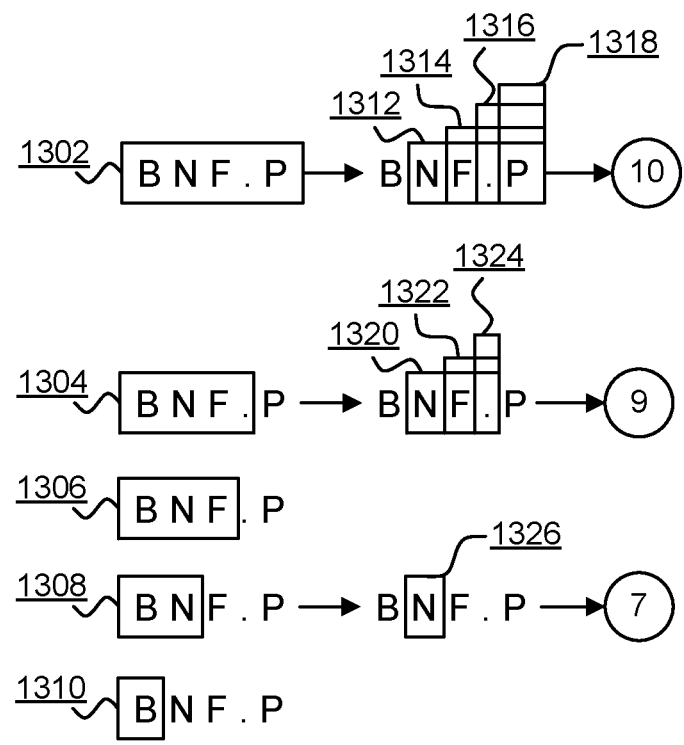
Figure 14:
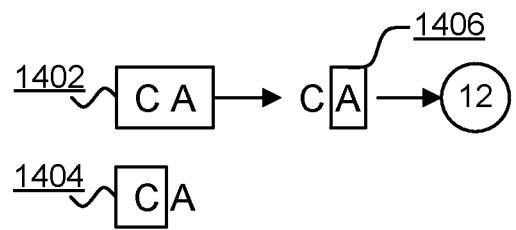

As illustrated in FIG. 13, the symbol pattern 'BNF.P' has prefixes: 'BNF.P' 1302 represented by state '10' in the state graph of FIG. 9; 'BNF.' 1304 represented by state '9'; 'BNF' 1306 represented by state '8'; 'BN' 1308 represented by state '7'; and 'B' represented by state '6'. The method of FIG. 11 identifies four proper suffixes for prefix 'BNF.P' 1302 as suffixes: 'NF.P' 1312; 'F.P' 1314; '.P' 1316; and 'P' 1318. Thus, the ordered set of proper suffixes PS for state '10' is given by:

$PS_{10}$={'NF.P', 'F.P', '.P', 'P'}

This ordered set of proper suffixes is added to the set of ordered sets SOS of proper suffixes at step 1110:

$SOS_{BNF.P}$={{'NF.P', 'F.P', '.P', 'P'}}

The method of FIG. 11 continues for the other prefixes 1304 to 1310 to provide the final set of ordered sets of proper suffixes, SOS, for symbol pattern 'BNF.P' as:

$SOS_{BNF.P}$={{'NF.P', 'F.P', '.P', 'P'}, {'NF.', 'F.', '.'}, {'N'}}

(notably, prefix 'BNF' 1306 is ineligible for identification of failure state mapping since it is followed by a wildcard character '.')

As illustrated in FIG. 14, the method of FIG. 11 applied to the symbol pattern 'CA' identifies a single proper suffix 'N' 1406. Accordingly, following the method of FIG. 11, the final set of ordered sets of proper suffixes, SOS, for symbol pattern 'CA' as:

$SOS_{CA}$={{'A'}}

When the method of FIG. 11 is further applied to the other exemplary symbol patterns, 'CBNF.X', 'DE..LM', and 'E.KLM', corresponding sets of ordered sets of proper suffixes, SOS, are generated as:

$SOS_{CBNF.X}$={{'BNF.X', 'NF.X', 'F.X', '.X', 'X'}, {'BNF.', 'NF.', 'F.', '.'}, {'BNF', 'NF', 'F'}, {'BN', 'N'}, {'B'}}

$SOS_{DE..LM}$={{'.LM', 'LM', 'M'}, {'.L', 'L'}, {'.'}}

$SOS_{E.\ KLM}$={{'.KLM', 'KLM', 'LM', 'M'}, {'.KL', 'KL', 'L'}, {'.K', 'K'}, {'.'}}

Figure 15:
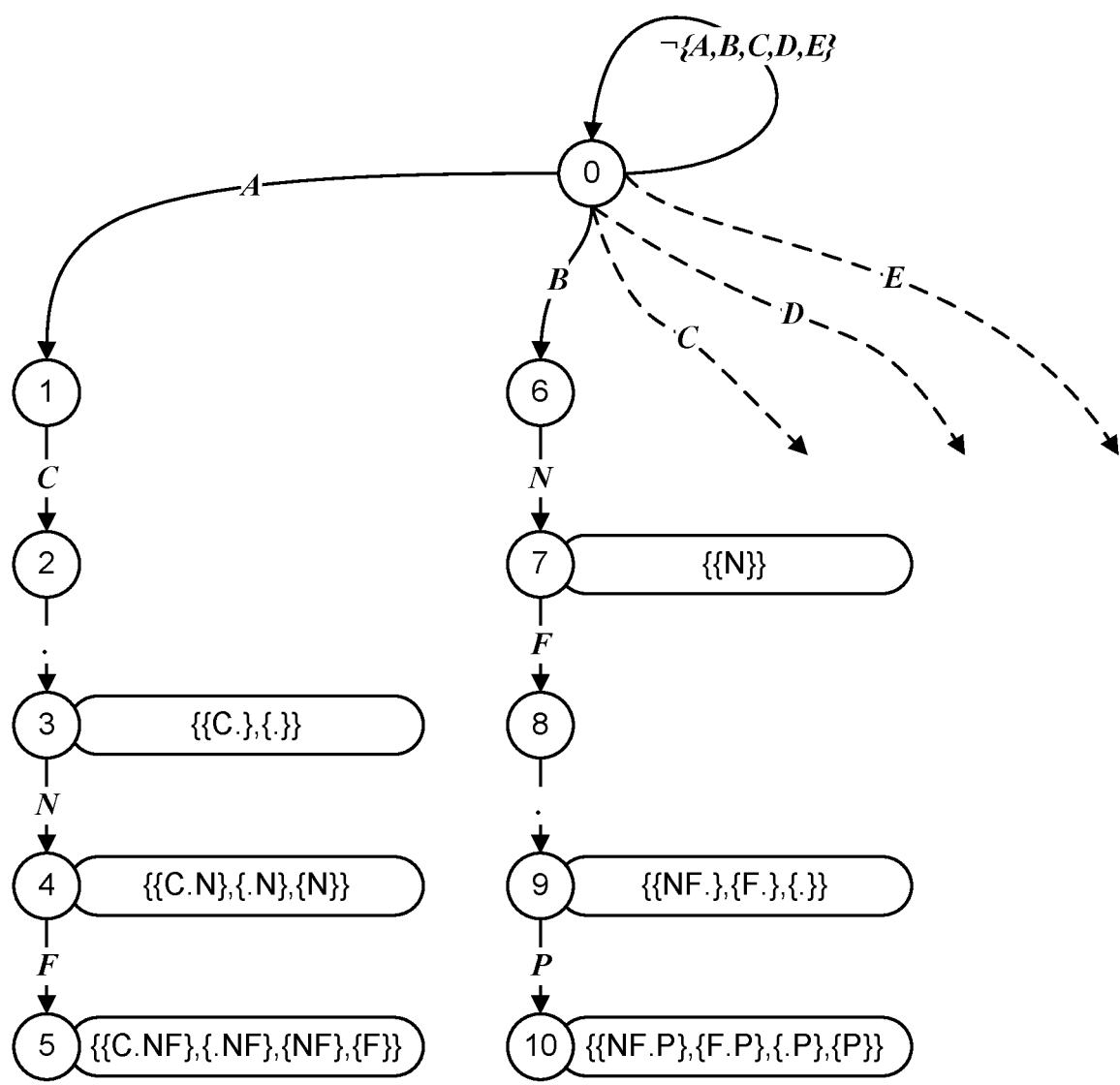

FIG. 15 is illustrates the association between individual ordered sets of proper suffixes and states in the state graph. For simplicity, FIG. 15 covers only those states for the exemplary symbol patterns 'AC.NF' and 'BNF.P' though it will be appreciated that all other exemplary symbol patterns and associated states could be added to this representation.

It will be appreciated that, while FIG. 11 is directed to the processing of search patterns, the approach and principles of the method of FIG. 11 could alternatively be based on processing a directed graph for a pattern matching machine 204, such as a graph generated by the Generate_goto_function of Algorithm 1, since such a graph represents all symbols in all search patterns 202.

Thus, following completion of the method of FIG. 11 for all symbol patterns, the step 1002 of FIG. 10 of identifying the set of all states for which failure state mappings may be generated is complete, the set comprising, for the exemplary symbol patterns, all of sets $SOS_{ACBN.F}$, $SOS_{BNF.P}$, $SOS_{CA}$, $SOS_{CBNF.X}$, $SOS_{DE..LM}$, and $SOS_{E.KLM}$.

Figure 16:
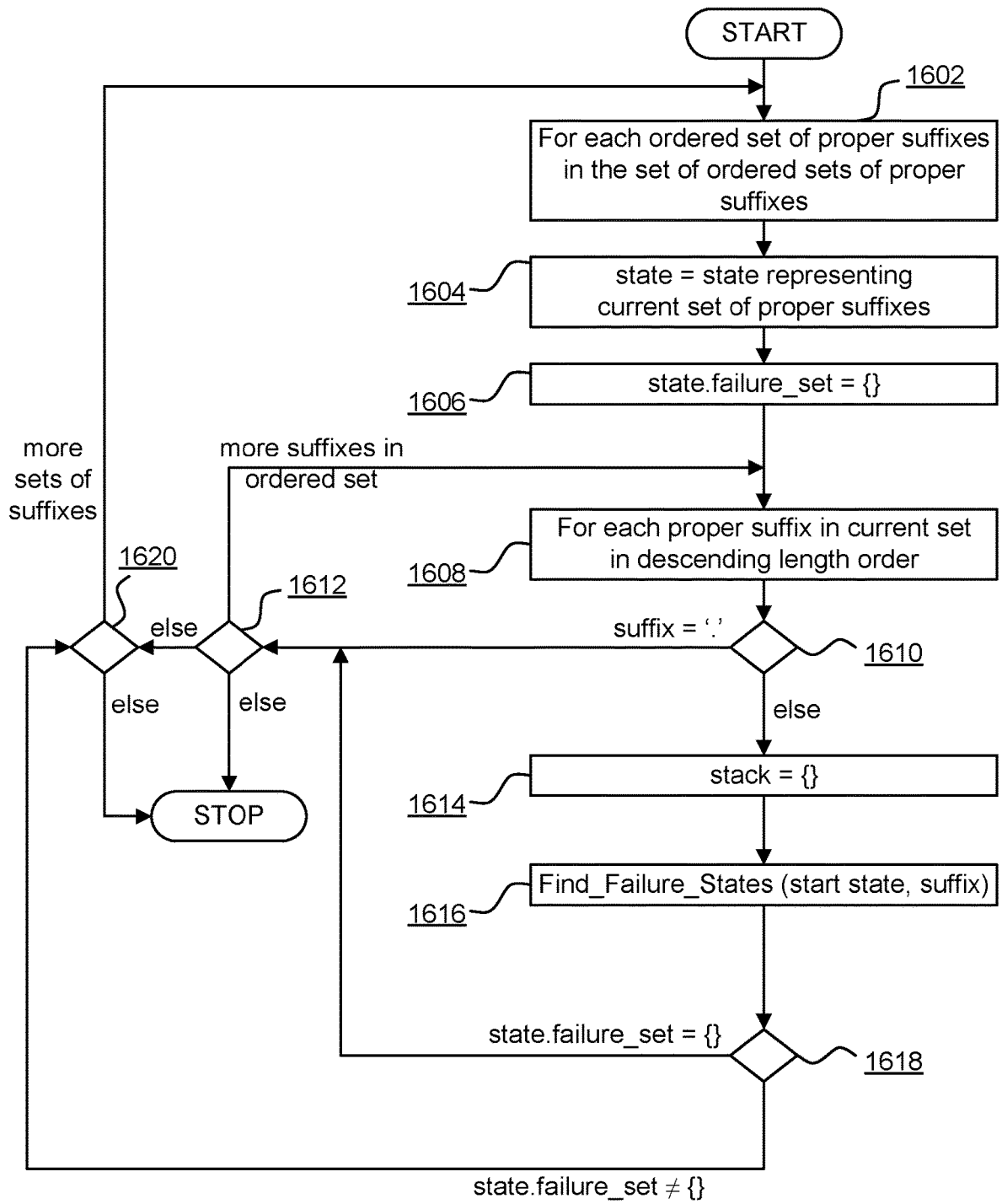
FIG. 16 is a flowchart of the find step of the flowchart of FIG. 10 in accordance with an embodiment of the present invention.

FIG. 16 is a flowchart of the find step 1004 of the flowchart of FIG. 10 in accordance with an embodiment of the present invention. FIG. 16 serves to populate the set of failure state mappings failure_set 410 for each state determined to be eligible for failure state mapping at step 1002 of FIG. 10. Thus, the method of FIG. 16 is performed for each symbol pattern 202. Initially, at step 1602, the method initiates an iteration for each ordered set of proper suffixes, PS, in the set of ordered sets SOS for a symbol pattern. At step 1604 the method identifies the state, state, for the current ordered set of proper suffixes. Recall from FIGS. 12 to 15, and the accompanying description thereof, that each ordered set of proper suffixes corresponds to a state in the state graph for the pattern matching machine 204. At step 1606 a set of failure state mappings, failure_set 410, for the current state is initialised to an empty set { }. Notably, the empty set can be used to indicate that the current state is mapped to the start state in the event that the goto function 206 returns fail. At step 1608 a nested iteration is initiated for each proper suffix in the current ordered set of proper suffixes in descending length order. If the current proper suffix is determined to consist exclusively of a wildcard '.' at step 1610, the method proceeds to step 1612 since such a suffix will always map to the start state as a failure state. Alternatively, at step 1614, the method initialises a stack to an empty set { }. Subsequently, at step 1616 the method executes an algorithm, 'Find_Failure_States', to populate the set of failure state mappings, failure_set 410, for the current state. An exemplary Find_Failure_States algorithm is described below with respect to Algorithm 2. Subsequently, at step 1618, if the set of failure state mappings, failure_set 410, for the current state is an empty set, the method proceeds to step 1612 to potentially reiterate for a subsequent proper suffix in the ordered set of proper suffixes. Alternatively, where the set of failure state mappings, failure_set 410, for the current state is not an empty set, the method proceeds to step 1620 to proceed to a subsequent ordered set of proper suffixes for the symbol pattern from step 1602. The processing of each proper suffix in descending length order ensures that failure state mappings for longer suffixes are identified first, and only if failure state mappings are not identified for a longer suffix will shorter suffixes be considered. Once failure states are identified for a suffix in an ordered set of proper suffixes, no further shorter suffixes will be considered in the ordered set and processing proceeds to the next ordered set of proper suffixes by virtue of step 1618.

The Find_Failure_States algorithm referenced used at step 1616 will now be described with reference to Algorithm 2. The Find_Failure_States algorithm populates the set of failure state mappings, failure_set 410, for a state in the directed graph of the pattern matching machine 204. In accordance with an embodiment of the present invention, the failure state mappings, failure_set 410 for a state takes the form of a set of zero or more triples:

$$\{(S_1, C_1, F_1) \ldots (S_p, C_p, F_p)\}$$

where S is a failure state to which a state is mapped, C is a 'guard stack' as an ordered set of zero or more symbols defining the conditions under which a failure state mapping is permitted, and F is the size of an output set for the failure state S (alternatively, F is the length of a longest output symbol sequence associated with the failure state S). While the above triple is proposed here for exemplary embodiments of the present invention, it will be apparent to those skilled in the art in view of the present teachings that alternative mechanisms for providing, representing and operating a set of failure state mappings, failure_set 410 can be employed.

Thus, a set of failure state mappings, failure_set 410 for a state (also referred to herein as state.failure_set) provides potentially multiple failure mappings for the state to new states S (failure states) in the event that the goto function 206 returns fail. The need for potentially multiple failure state mappings arises due to the possibility that a current state of a pattern matching machine 204 corresponds to a state representing pattern symbols including a wildcard metacharacter. When the pattern matching machine 204 is operating in use for matching symbol patterns within an input symbol sequence, the particular input symbols constituting the wildcard pattern symbol are known, and can inform a determination of an appropriate failure state mapping. However, prior to a runtime of the pattern matching machine 204, at the point of generating the pattern matching machine 204 including a directed graph and failure state mappings, such runtime input symbols are unknown. Accordingly, it is necessary to determine conceivable failure state mappings for states in the state graph, and where those states correspond to proper suffixes of prefixes of symbol patterns 202 that include wildcards, refer, in use, to the input symbols constituting such wildcards. In accordance with embodiments of the present invention, such conceivable failure state mappings are determined and stored in the set of failure state mappings, failure_set 410, each failure state mapping being associated with a guard stack C defining the particular symbols, in an input symbol sequence at runtime, constituting wildcards in a proper suffix of a mapped symbol pattern prefix, in order for a failure mapping to be permitted. The guard stack C provides an ordered set of zero or more symbols. It will be appreciated that, when a mapped state represents a symbol pattern, or portion of a symbol pattern, including wildcards, the guard stack C for each failure mapping must include a symbol condition for each wildcard in the symbol pattern portion (although compression of the guard stack C, which might include removal of redundancy with appropriate protections, is conceivable). Further, the ordered nature of the guard stack C is suitable, in conjunction with the ordered set of offsets 406 for a state, to permit the ready identification of symbols in an input symbol sequence at offsets corresponding to wildcards in a symbol pattern, or portion thereof, for comparison with the guard stack C.

The Find_Failure_States algorithm of Algorithm 2 uses a procedure "find_transition_states". The procedure find_transition_states accepts, as input, a state, st, and a symbol, sy, and returns a set of (transition, state) pairs according to the goto graph. Each (transition, state) pair comprises a transition from st and a state following the transition (i.e. the state transitioned to). The find_transition_states procedure returns (transition, state) pairs for transitions matching the input symbol sy. Where sy is a literal symbol, then find_transition_states returns (transition, state) pairs for any transition from st corresponding to a symbol matching the literal symbol sy, and any transition from st that corresponds to a wildcard symbol. Where sy is itself a wildcard symbol, then find_transition_states returns (transition, state) pairs for all transitions from st corresponding to literal symbols, and any transition from st that corresponds to a wildcard symbol. Thus, in effect, find_transition_states provides a set of (transition, state) pairs for all transitions from st 'matching' the symbol sy, with such matching taking account of wildcards in either or both the symbol sy and the symbols corresponding to the transitions from the state st The particular implementation of the find_transition_states procedure will be apparent to those skilled in the art on the basis of the teachings herein and will not be described further here.

```
1   Algorithm 2: Find_Failure_States
2   Globals: failure_set of failure mappings (failure state,
        {guard_stack}, output size); stack
3   Input: state state; suffix a_1...a_n
4   begin
5       transitionStates ← find_transition_states (state, a_1)
6       if transitionStates = { } then return
7       else
8       begin
9           for each (T, state_T) pair in transitionStates
10          begin
11              if a_1 = wildcard then push T to stack
12              if n=1 then
```

```
13        begin
14            output ← | state_T.output |
15            failure_set ← failure_set ∪ (state_T, stack,
                  output )
16        end
17        else Find_Failure_States (state_T, a_2..a_n)
18        If a_1 = wildcard then pop stack
19    end
20   end
21   return
22 End
```

The Find_Failure_States algorithm of Algorithm 2 is an exemplary recursive algorithm for populating the set of failure state mappings, failure_set 410, for a state (the mapped state) in the directed graph of the pattern matching machine 204. Find_Failure_States, accepts as input a state, state, in the directed graph from which the algorithm will search for a suitable failure state. The algorithm further accepts as input a proper suffix as a set of symbols $\{a_1 \ldots a_n\}$. Arguments for these input parameters are indicated in FIG. 16 and, on initial invocation of the Find_Failure_States algorithm for a mapped state, the arguments correspond to the start state of a directed state graph for the pattern matching machine 204 and a proper suffix for a symbol pattern. The algorithm further refers to 'global' variables failure_set (initialised at step 1606 of FIG. 16 and structured as described above) and stack (initialised at step 1614 of FIG. 16, and being a stack data structure). The global nature of these variables means that the values of these variables persists and is shared between invocations of the Find_Failure_States algorithm.

At line 5, the algorithm obtains a set of (transition, state) pairs for all transitions from state that match a first symbol in the input suffix, $a_1$. This is achieved by way of the find_transition_states procedure described above, and the resulting set of (transition, state) pairs is stored in transitionStates. If transitionStates is determined to be an empty set { }, the algorithm returns at line 6 since such an empty set indicates there are no states corresponding to the first symbol of the suffix $\{a_1 \ldots a_n\}$ and, accordingly, the current state, state, cannot constitute a failure mapping for the suffix. In the alternative, from line 8, an iteration is initiated through each (transition T, state state_T) pair in transitionStates. At line 11, if the first symbol $a_1$ of the suffix is a wildcard then the transition T is pushed to stack. If the length of the suffix $\{a_1 \ldots a_n\}$ is determined to be 1 at line 12, then state_T constitutes a failure state for the mapped state. In this case, the algorithm determines the size of the output function (e.g. the number of output symbol sequences in the set of output symbol sequences 408, or in some embodiments, the length of the longest output symbol sequence) for state_T and adds a new failure mapping triple to failure_set at line 15. The new failure mapping triple includes the current state, state, the contents of the stack, stack, (copied by value), and the determined size of the output function.

At line 17, where the length of the suffix $\{a_1 \ldots a_n\}$ is determined to be other than 1, the algorithm recurses with arguments state_T and the suffix $\{a_2 \ldots a_n\}$. Subsequently, if the first symbol $a_1$ of the suffix is a wildcard, then the transition T that was pushed to stack at line 11 is popped at line 18. On completion of the iteration of lines 9 to 19 the algorithm returns at line 21.

The Find_Failure_States algorithm is effective at identifying, by recursion through the entire state graph for a pattern matching machine 204, all possible failure states in a directed graph for a given state. In doing so, the algorithm further identifies, for each failure state mapping, the guard stack C defining the conditions for wildcard pattern symbols in order for a failure transition to be permitted. Further, the algorithm identifies, for each failure state mapping, a size, F, of an output symbol set for the pattern matching machine 204 in use to determine if a failure state for a state generates an output, and for determining how much of a historical input sequence of symbols is required to constitute the output.

Since the Find_Failure_States algorithm identifies all possible failure states in a directed graph for a given state, the resulting set of failure state mappings, failure_set 410 can include multiple failure state mappings each being applicable for a particular input symbol sequence. For example, a first failure state mapping can include a gate stack having a literal symbol condition, and a second failure state mapping can include a gate stack having a wildcard symbol condition. Such multiply applicable failure state mappings arise due to the support for wildcard symbol patterns in accordance with the present invention. When processing an input symbol sequence and needing to choose between two equally applicable failure state mappings, the pattern matching machine 204 will always choose a failure state mapping having a guard stack C containing the most literal symbols over any other failure state mapping having a guard stack C containing fewer literals (having, instead, more wildcards).

A prioritisation method can be employed at a runtime of the failure function 208 of the pattern matching machine 204 to determine, where multiple failure state mappings exist in a failure_set having identical guard stacks C, which failure state mapping should take precedence. In any event, according to embodiments of the present invention, a failure mapping state corresponding to a greatest number of literal symbols in a symbol pattern will take precedence.

This complexity shall now be considered in detail by way of example with reference to the second set of exemplary symbol patterns below and FIG. 17.

xa.c
ab
a.cd

Figure 17:
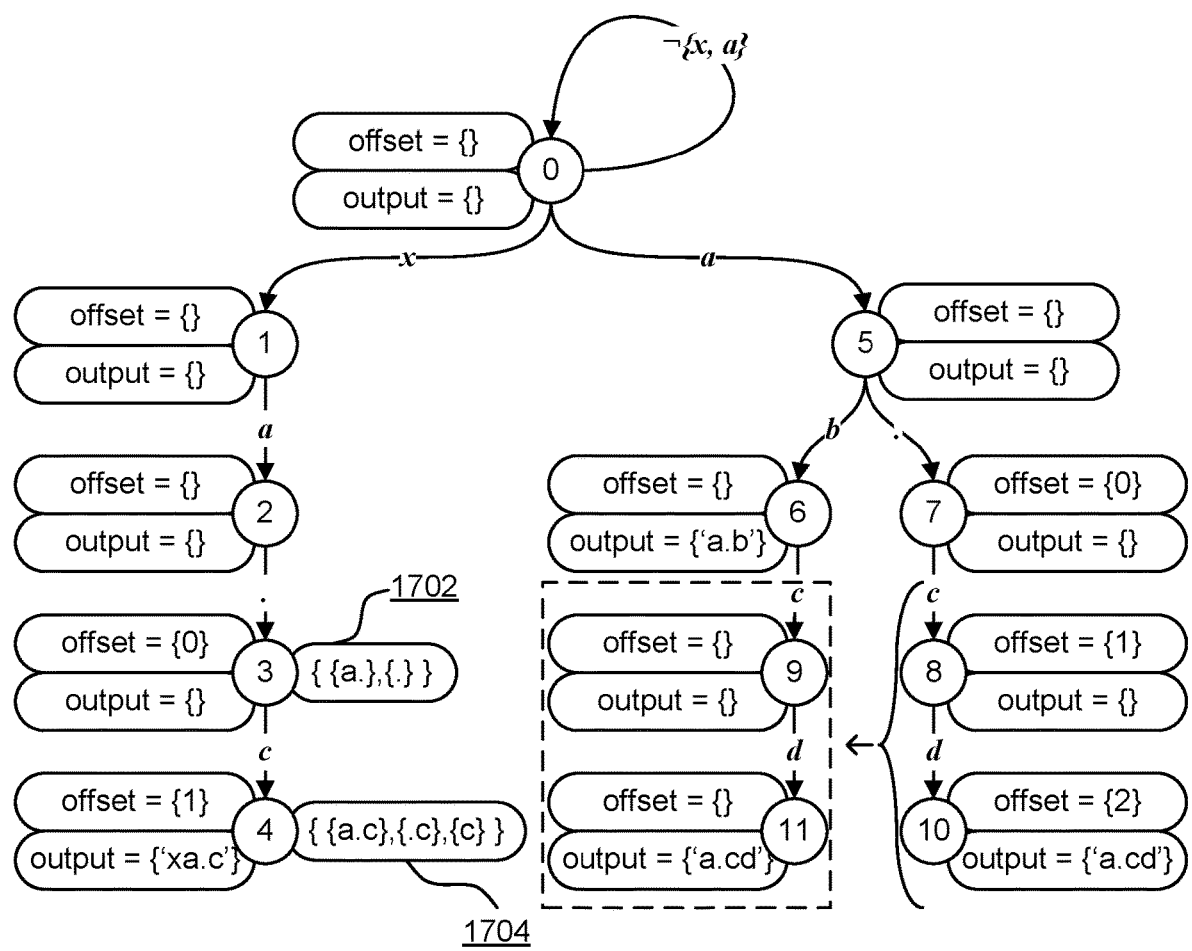
FIG. 17 depicts a state graph of a pattern matching machine in accordance with an embodiment of the present invention.

FIG. 17 depicts a state graph of a pattern matching machine 204 in accordance with an embodiment of the present invention. The directed state graph of FIG. 17 constitutes the goto function g 206 and is generated from the second set of exemplary symbol patterns using the Generate_goto_function of Algorithm 1. It can be seen from FIG. 17 that states '3', '4', '7', '8' and '10' include offset values in each set of offsets 406 respectively to indicate the offset location of a wildcard symbol in a symbol pattern prefix. Further, states '4', '6' and '10' include output symbols in each set of output symbol sequences 408 corresponding to the complete symbol patterns 'xa.c', 'ab' and 'a.cd' respectively.

It can also be seen that state '5' includes a first literal transition to state '6' corresponding to literal symbol 'b', and a second wildcard transition to state '7'. Further, state '7' includes a literal transition to state '8'. As previously described, in the situation where a directed graph of a pattern matching machine 204 includes a state having both a literal and wildcard transition, such as state '5', post-processing is performed to adapt the goto function g 206 to copy all states and transitions that occur subsequent to the wildcard transition to also occur subsequent to all literal transitions originating from the same state as the wildcard transition. Thus, the state '8', the transition corresponding to the symbol 'c' leading to state '8', the state 10, and the transition corresponding to the symbol 'd' leading to state '10' are each copied to occur subsequent to state '6' by creating new states '9' and '11' and new transitions from state '6' to state '9' corresponding to the symbol 'c' and from state '9' to state '11' corresponding to symbol 'd'. The states and transitions copied are indicated in FIG. 17 within the dashed box. Additionally, the set of output symbol sequences 408 for the copied state '8' is reproduced for the new state '8'. However, notably, the set of offsets 406 for the copied states '8' and '10' are adapted, for the new states '9' and '11', to accommodate the fact that the new states '9' and '11' are subsequent to a literal transition from state '5' corresponding to symbol 'b' as opposed to a wildcard transition. Thus, in use, the pattern matching machine 204 having the directed state graph of FIG. 17 includes a goto function g 206 operating in accordance with the graph of FIG. 17 and selecting state transitions corresponding to literal symbols in preference to state transitions corresponding to wildcard symbols.

FIG. 17 further indicates the ordered set of proper suffixes of prefixes generated by the method of FIG. 11 for each state corresponding to all or part of the first exemplary symbol pattern 'xa.c'. Thus, state '4' has associated the ordered set of proper suffixes 1704 {{a.c},{.c},{c}}, and state '3' has associated the ordered set of proper suffixes 1702 {{a.},{.}}. State '2' is not eligible for failure state mapping since it has a subsequent state accessible via a wildcard transition state. It will be appreciated that similar ordered sets of proper suffixes will be generated for states '6' to '11' though these are omitted for clarity.

The method of FIG. 16 will now be considered for the arrangement of FIG. 17 to demonstrate the determination of a set of failure state mappings, failure_set 410 for a first of the ordered set of proper suffixes, being the set of proper suffixes for state '4'. Starting with ordered set {{a.c},{.c},{c}} at step 1602, step 1604 determines the current state associated with the ordered set as state '4'. Subsequently, at step 1606, the set of failure state mappings, failure_set 410 for state '4' is initialised to an empty set { }. At step 1608 the method iterates through each proper suffix in the set {{a.c},{.c},{c}} in descending length order starting with proper suffix 'ac'. At step 1614 an empty stack { } is initialised and at step 1616 the Find_Failure_States algorithm (Algorithm 2) is invoked sending the start state '0' for the directed graph and the current proper suffix 'ac' as arguments. The Find_Failure_States algorithm populates the failure_set 410 with failure states for the current state '4'. The detailed operation of the Find_Failure_States algorithm for the arguments '0' (start state) and 'a.c' (suffix) is illustrated in FIGS. 18a to 18d, with each of FIGS. 18b to 18d corresponding to one recursive execution of the Find_Failure_States algorithm. Line numbers of the Find_Failure_States algorithm, Algorithm 2, are included in parentheses to the left of each status step in each of FIGS. 18a to 18d.

With reference to FIG. 18a the Find_Failure_States algorithm is initially invoked for state '0' and suffix 'a.c'. Accordingly, the length of the suffix, n, is 3. At line 5, the transitionStates is determined to be {{'a', '5'}} and the algorithm iterates through each entry in the transitionStates set from line 9. At line 17 the algorithm recurses by calling Find_Failure_States with the arguments ('5', '.c'), resulting in the execution depicted by FIG. 18b.

With reference to FIG. 18b, the Find_Failure_States algorithm is invoked for state '5' and suffix '.c' and the transitionStates set is determined to be {{'b','6'}, {'7', '.'}} at line 5. Line 9 iterates through each element in the transitionStates set, initially {'b', '6'}. Since the initial suffix symbol $a_1$ is a wildcard symbol '.', the transition for the current element in the transitionStates set, 'b', is pushed to the stack at line 11. Subsequently, at line 17, the algorithm recurses by calling Find_Failure_States with the arguments ('6', 'c'), resulting in the execution depicted by FIG. 18c.

With reference to FIG. 18c, the Find_Failure_States algorithm is invoked for state '6' and suffix 'c' and the transitionStates set is determined to be {{'c','9'}} at line 5. Line 9 iterates through each element in the transitionStates set, i.e. only element {'c', '9'}. Since the suffix length in FIG. 18c is 1 (n=1), the algorithm determines the size of the set of output symbol sequences 408 at line 14. The set of output symbol sequences for state '9' is empty. At line 15 a new failure mapping is added to the failure_set, the new failure mapping being characterised by the triple ('9', {'b'}, 0) (i.e. the failure state is state '9', the guard stack is {'b'}, and the size of the output function of the failure state is 0). Subsequently, at line 21, the algorithm returns to its caller, FIG. 18b.

Returning to FIG. 18b, the recursion to FIG. 18c resulted in the set of failure state mappings comprising the set {('9', {'b'}, 0)}. At line 18 the stack is popped, and the iteration proceeds to the next element in the transitionStates set, {'.', '7'} at line 9. Since the initial suffix symbol $a_1$ is a wildcard symbol '.', the transition for the current element in the transitionStates set, '.', is pushed to the stack at line 11. Subsequently, at line 17, the algorithm recurses by calling Find_Failure_States with the arguments ('7', 'c'), resulting in the execution depicted by FIG. 18d.

With reference to FIG. 18d, the Find_Failure_States algorithm is invoked for state '7' and suffix 'c' and the transitionStates set is determined to be {{'c','8'}} at line 5. Line 9 iterates through each element in the transitionStates set, i.e. only element {'c', '8'}. Since the suffix length in FIG. 18c is 1 (n=1), the algorithm determines the size of the set of output symbol sequences 408 at line 14. The set of output symbol sequences for state '8' is empty. At line 15 a new failure mapping is added to the failure_set, the new failure mapping being characterised by the triple ('8', {'.'}, 0) (i.e. the failure state is state '8', the guard stack is {'.'}, and the size of the output function of the failure state is 0). Subsequently, at line 21, the algorithm returns to its caller, FIG. 18b.

Returning to FIG. 18b, the recursion to FIG. 18c resulted in the set of failure state mappings comprising the set {('9', {'b'}, 0) ('8', {'.'}, 0)}. At line 18 the stack is popped, and the iteration ceases at line 19. Subsequently, at line 21, the algorithm returns to its caller, FIG. 18a.

Returning to FIG. 18a, the recursion to FIG. 18b resulted in the set of failure state mappings comprising the set {('2', {'b'}, 0), ('8', {'.'}, 0)}. The iteration ceases at line 19. Subsequently, at line 21, the algorithm returns to its caller, step 1616 of FIG. 16.

On completion of step 1616 of FIG. 16, and execution of the Find_Failure_States algorithm (Algorithm 2) as depicted in FIGS. 18a to 18d, the set of failure state mappings, —failure_set 410 for state '4' of FIG. 17 is determined to be {('9', {'b'}, 0), ('8', {'.'}, 0)}. Thus two failure mappings are provided, one to state '9' with the guard stack C indicating that the value of an input symbol corresponding to the wildcard in transition to state '3' must be 'b'. The second failure mapping maps to state '8' with the guard stack C indicating that the value of an input symbol corresponding to the wildcard transition to state '3' must be '.'. It can therefore be seen that, with the directed state graph of FIG. 17, state '4' has two failure state mappings having equally applicable for an input symbol 'b' corresponding to the wildcard transition to state '3'. Thus the set of failure state mappings 410 needs to be prioritised. In undertaking such prioritisation a failure state mapping to a failure state corresponding to more literal symbol pattern symbols takes precedence over a failure state corresponding to fewer literal symbol pattern symbols. Thus, failure mapping to state '8', which corresponds to symbol pattern 'ac' is given a lower precedence in favour of failure mapping to state '9' which corresponds to symbol pattern 'abc' because pattern 'abc' includes fewer wildcards (indeed no wildcards).

It will be appreciated by those skilled in the art that the deduplication may be undertaken partly or entirely as part of the process of generating the set of failure state mappings 410, such as part of the method of FIG. 16 or as part of the Find_Falure_states algorithm, Algorithm 2, such that post-processing deduplication can be avoided.

Figure 19:
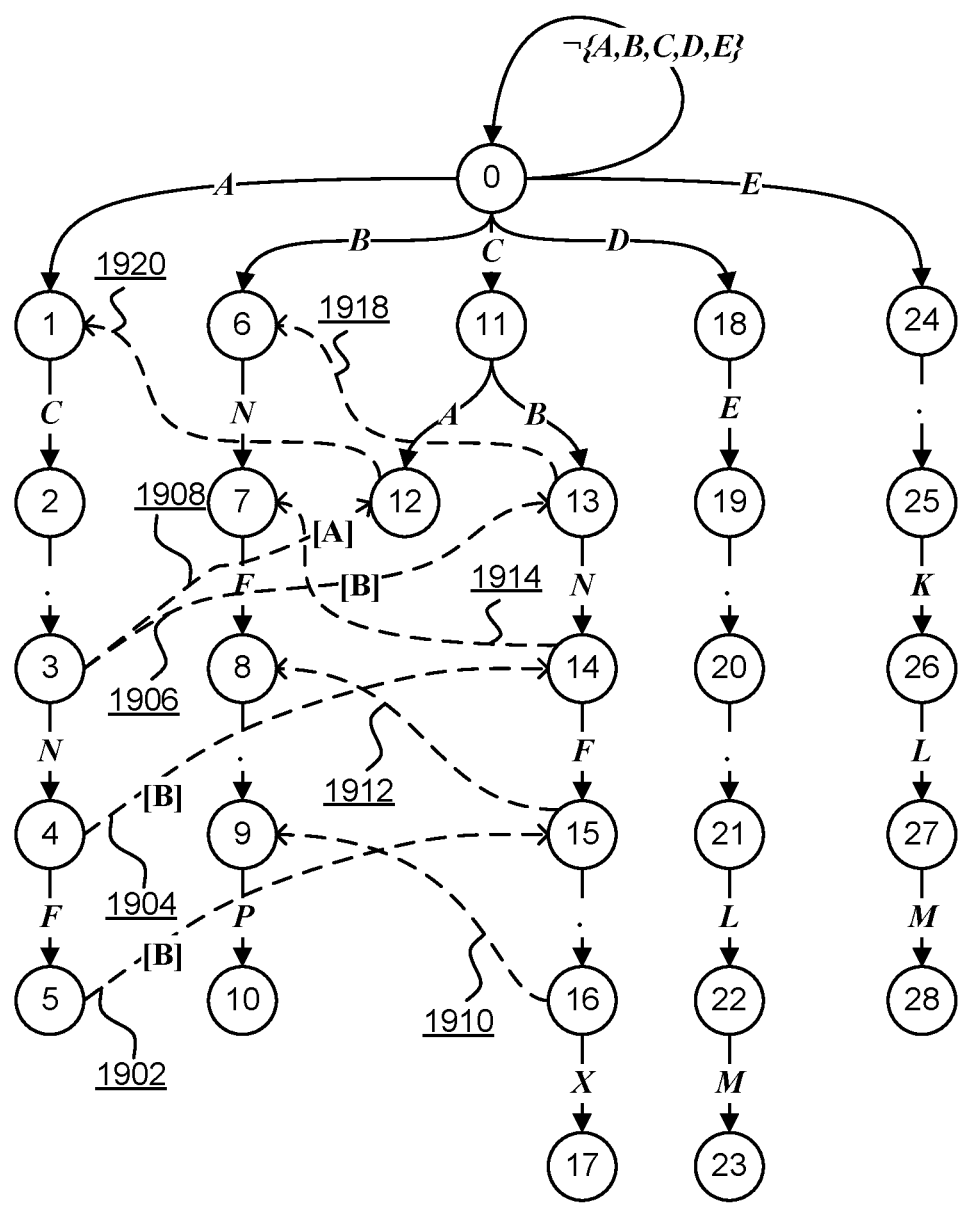
FIG. 19 depicts a state graph of a pattern matching machine with failure states in accordance with an embodiment of the present invention.

For completeness, the directed graph of states for the first exemplary set of symbol patterns illustrated in FIG. 9 is reproduced in FIG. 19 with failure state mappings indicated as directed broken lines between states. The failure state mappings are determined in accordance with the methods of FIGS. 10, 11, 16 and Algorithm 2. In particular, state '5' has a failure mapping 1902 to state '15' with the gate stack {'B'}. State '4' has a failure mapping 1904 to state '14' with the gate stack {'B'}. State '3' has a failure 1906 mapping to state '13' with the gate stack {'B'} and a second failure mapping 1908 to state '12' with the gate stack {'A'}. State '16' has an unconditioned failure mapping 1910 to state '9' (i.e. with an empty gate stack { }). State '15' has an unconditioned failure mapping 1912 to state '8'. State '14' has an unconditioned failure mapping 1914 to state '7'. State '13' has an unconditioned failure mapping 1918 to state '6'. State '12' has an unconditioned failure mapping 1920 to state '1'.

Figure 20:
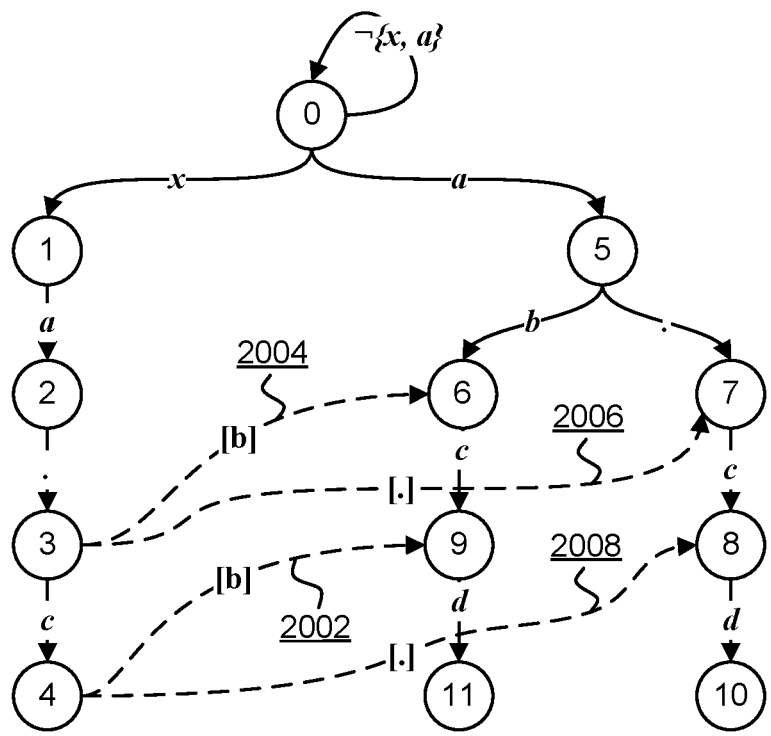
FIG. 20 depicts a state graph of a pattern matching machine with failure states in accordance with an embodiment of the present invention.

Similarly, the directed graph of states for the second exemplary set of symbol patterns illustrated in FIG. 17 is reproduced in FIG. 20 with failure state mappings indicated as directed broken lines between states. State '4' has a failure mapping 2002 to state '9' with the gate stack {'b'}. State '4' also has a failure mapping 2008 to state '8' with the gate stack {'.'}. State '3' has a failure mapping 2004 to state '6' with the gate stack {'b'}. State '3' also has a failure mapping 2006 to state '7' with gate stack {'.'}.

In use, by the pattern matching machine 204, the set of failure state mappings failure_set 410 is used by the failure function 208 to determine a failure state for a current state in the state machine in the event that the goto function g 206 returns fail for an input symbol in an input symbol sequence. Algorithm 3 provides an exemplary failure function 208 and will now be considered in detail. The failure function 208 of algorithm 3 receives, as input, a current state of the pattern matching machine 204 and an input symbol context as a set of h most recent input symbols. The selection of a magnitude of h can be regarded as a design choice to balance execution efficiency against reliability. Alternatively, the magnitude of h can be determined based on the cardinalities of the output functions determined for, and stored in, each failure mapping as described above. In a further alternative, the magnitude of h can be determined based on a measure of an extent or span of the directed graph for the pattern matching machine 204. Thus, in use, the failure function 208 receives a current state, state, and a symbol set $\{a_{m-h} \ldots a_m\}$ where m corresponds to an index of a most recently received symbol in the input symbol sequence. The failure function 208 also accesses a set of failure state mappings, failure_set 410 for the state, state, and further the set of offsets 406 $\{O_1 \ldots O_n\}$.

```
1   Algorithm 3: failure // return failure state for a current state and input
        symbol context
2   Input: state state, input string a_{m-h}...a_m
3   Returns: failure state
4   begin
5       for each failure mapping, (S, {C_1, ... C_n}, F), in state.failure_set
6       begin
7           i ← 1
8           while ( i ≤ n and (C_i = wildcard or a_{m-On} = C_i) ) then i ←
                i + 1
9           if i > n then return S // failure transition found (S)
10      end
11      return start state
12  end
```

Considering Algorithm 3, initially at line 5 the algorithm initiates an iteration through each failure mapping in the set of failure state mappings 410 for the current state, state, each failure mapping being characterised as (S, $\{C_1, \ldots C_n\}$, F), where $\{C_1 \ldots C_n\}$ is a set of guard symbols C, or conditions, to be applied to a historical input symbol sequence in order to permit a transition to the failure state S. At line 7 a counter i is initialised to 1 and a nested loop is initiated at line 8 to iterate while the counter is less than or equal to the number of guard symbols, n, in the current failure mapping. Further, the nested loop of line 8 only iterates while the current guard symbol $C_i$ is a wildcard (i.e. where the input symbol is of no significance to the guard state condition) or, alternatively, while a historical input symbol at the offset indicated in the nth element of the set of offsets 406 ($a_{m-On}$) matches the current guard symbol $C_i$. Thus, the value of the counter i increments only while the relevant historical input symbols a match the required guard symbols C (or while guard symbols are wildcards). Accordingly, i will exceed n only if all guard symbol C conditions are satisfied. This is tested at line 9 which concludes, in response to a positive determination, that S is a suitable failure transition for the current state, state, and the historical input symbol sequence $\{a_{m-h} \ldots a_m\}$. Where such a positive determination is not made, the algorithm returns the start state by default as a failure state at line 11.

It will be appreciated that the failure function 208 of Algorithm 3 does not take account of multiple failure state mappings being equally applicable for a input symbol context due to a failure state mapping having wildcards in the gate stack C. In this regard a modified version of the failure algorithm 208 is provided as Algorithm 3.1.

```
1   Algorithm 3.1: failure // return failure state for a current state and
        input symbol context
2   Input: state state, input string a_{m-h}...a_m
3   Returns: failure state
4   Begin
5       applicable_failure_mappings ← { }
6       for each failure mapping, (S, {C_1, ... C_n}, F), in state.failure_set
7       begin
8           i ← 1
9           while ( i ≤ n and (C_i = wildcard or a_{m-On} = C_i) ) then
                i ← i + 1
10          if i > n then
                applicable_failure_mappings ←
                applicable_failure_mappings ∪ S
11      End
12      if applicable_failure_mappings ≠ { }
13      begin
14          return failure mapping in applicable_failure_mappings
                having state stack containing greatest number of
                literal symbols
15      end
16      else return start state
17  End
```

The failure function 208 of Algorithm 3.1 creates a set of applicable_failure_mappings populated with each failure mapping in the failure_set having a state stack C that is satisfied by the input symbol context. Subsequently, at line 14, the algorithm identifies and returns a failure mapping from the set of applicable_failure_mappings that has a state stack containing the greatest number of literal symbols. In this way, failure mappings with a greater number of literal symbols take precedence over failure mappings with fewer literal symbols when the pattern matching machine 204 transitions to a failure state for a state.

Preferably, to improve the efficiency of the technique, the failure state mappings can be sorted in the set of failure state mappings 410 such that the set 410 is an ordered set ordered by the number of literal guard stack symbols C in each failure state mapping. In this way, a selection of a failure state mapping having a greatest number of literal guard stack symbols C would be identified first.

In use, by the pattern matching machine 204, the set of failure state mappings failure_set 410 is further used by the output function 210 to determine set of output symbol sequences 408 corresponding to matching symbol patterns 202 in an input symbol sequence 202. Algorithm 4 provides an exemplary output function 210 and will now be considered in detail. The output function 210 of algorithm 4 receives, as input, a current state of the pattern matching machine 204 and an input symbol context as a set of h most recent input symbols. The selection of a magnitude of h is discussed above with respect to the failure function 208. Thus, in use, the output function 210 receives a current state, state, and a symbol set $\{a_{m-h} \ldots a_m\}$ where m corresponds to an index of a most recently received symbol in the input symbol sequence. The output function 210 further accesses: a set of failure state mappings, failure_set 410 for state; a set of offsets 406 $\{O_1 \ldots O_n\}$ for state; and a set of output symbol sequences 408 $\{Q_1 \ldots Q_r\}$ for state.

```
1   Algorithm 4: Output function // provides set of output symbol
    sequences for a state
2   Input: state state, input string a_{m-h}...a_m
3   Returns: set of output symbol sequences for a state
4   begin
5       output_set = { }
6       for each symbol sequence, Q, in the set of output symbol
        sequences {Q_1... Q_r}
7       begin
8           P ← Q
9           for i ← 1 to n do P_{r-Oi} ← a_{m-Oi}
10          output_set ← output_set ∪ { P_1...P_r }
11      end
12      for each failure mapping, (S, {C_1, ... C_n}, F), in state.failure_set
13      begin
14          if F ≠ 0 then
15          begin
16              i ← 1
17              while ( i ≤ n and (C_i = wildcard or a_{m-On}= C_i) )
                then i ← i + 1
18              if i > n then
19              begin
20                  for each symbol sequence, L, in the set
                            of symbol sequences {L_1...L_r} for S
21                  begin
22                      k ← length of L
23                      output_set ← output_set ∪ { a_{m-k} ... a_m }
24                  end
25              end
26          end
27      end
28      return output_ set
29  end
```

Considering Algorithm 4, initially at line 5 the algorithm initiates an output_set of output symbol sequences to an empty set { }. Subsequently, at line 6, the algorithm initiates an iteration through each symbol sequence, Q, in the set of output symbol sequences $\{Q_1 \ldots Q_r\}$ 408. For each symbol sequence, Q, the algorithm copies the set of output symbols to P at line 8 (this preserves the integrity of the set of output symbol sequences 408). At line 9 the algorithm initiates an iteration through each of the n offsets in the set of offsets 406 $\{O_1 \ldots O_n\}$, each offset corresponding to the position of a wildcard symbol in the prefix of the symbol sequence corresponding to state. For each offset, at line 9, the algorithm substitutes the wildcard symbol in the symbol sequence ($P_{r-Oi}$) for a symbol at the corresponding offset in the set of historical input symbols ($a_{m-Oi}$). Thus, the symbols sequence P is modified to reflect the historical input symbols $\{a_{m-h} \ldots a_m\}$ in place of wildcard symbols. Subsequently, at line 10, the modified symbol sequence is added to the output_set.

At line 12, the algorithm initiates an iteration through each failure mapping in the set of failure state mappings 410 for state, each failure mapping being characterised as (S, $\{C_1, \ldots C_n\}$, F), where $\{C_1 \ldots C_n\}$ is a set of guard symbols C, or conditions, as described above with respect to Algorithm 3. At line 14 the algorithm determines if the failure mapping relates to a state, S, that having a non-empty set of output symbol sequences.

At line 16 a counter us initialised to 1 and a nested loop is initiated at line 17 to iterate while the counter is less than or equal to the number of guard symbols, n, in the current failure mapping. Further, the nested loop of line 17 only iterates while the current guard symbol $C_i$ is a wildcard or, alternatively, while a historical input symbol at the offset indicated in the nth element of the set of offsets 406 ($a_{m-On}$) matches the current guard symbol $C_i$. Thus, the value of the counter i increments only while the relevant historical input symbols a match the required guard symbols C (or while guard symbols are wildcards). Accordingly, i will exceed n only if all guard symbol C conditions are satisfied. This is tested at line 18 which concludes, in response to a positive determination, that the historical input symbols match the failure state S and the set of output symbol sequences for the failure state S are occasioned for output by the historical input symbols. Accordingly, a loop is initiated at line 20 through all symbol sequences in the set of symbol sequences 408 for state S. For each symbol sequence, a number of historical bytes corresponding to the length of the symbol sequence are added to the output_set at lines 22 and 23. Finally, at line 28, the output_set is returned.

Figure 21:
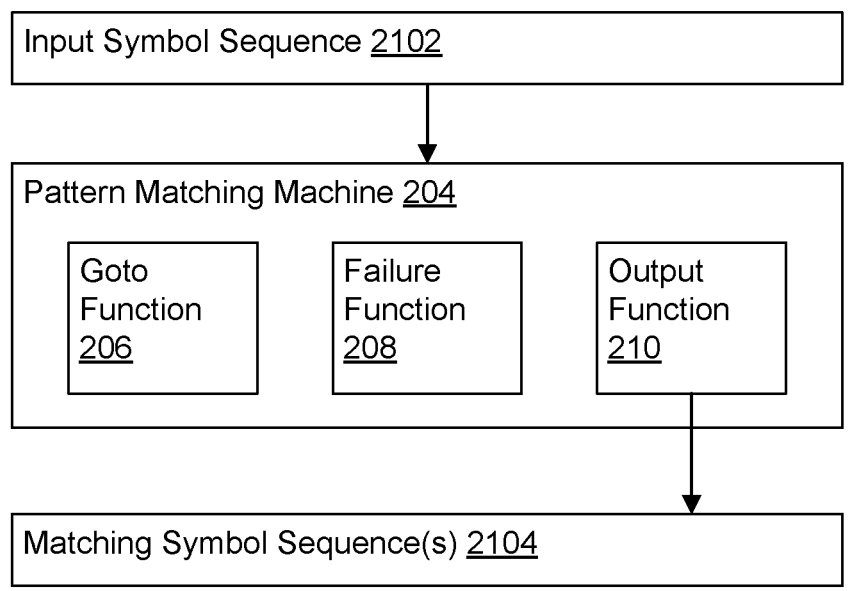
FIG. 21 is a schematic illustration of a pattern matching machine in use for identifying matching symbol sequences in an input symbol sequence in accordance with an embodiment of the present invention.

FIG. 21 is a schematic illustration of a pattern matching machine 204 in use for identifying matching symbol sequences 2104 in an input symbol sequence 2102 in accordance with an embodiment of the present invention. In an embodiment, the pattern matching machine 204 is generated by the pattern matching machine generator 200 of FIG. 2 as described above. In use, the pattern matching machine receives input symbols $\{t_1 \ldots t_n\}$ and outputs sequences of input symbols matching symbol patterns 202 represented by the pattern matching machine 204. Algorithm 5 provides an exemplary method of the pattern matching machine and will now be described. The algorithm receives, as input, a sequence of input symbols $\{t_1 \ldots t_n\}$.

```
1   Algorithm 5: pattern_matching_machine
2   Input: input symbol sequence t_1 ... t_n
```

```
3   begin
4       state ← start state
5       for i ← 1 until n do
6       begin
7           while g(state, t_i) = fail do state ← failure (state, t_{i-h}...t_i)
8           state ← g(state, t_i)
9           if Output(state) ≠ { }
10          begin
11              for all output sequences, S, in output_set do print S
12          end
13      end
14  end
```

Initially, at line 4, the current state of the pattern matching machine 204 is set to a start state of a state machine. At line 5 an iteration is initiated for all symbols in the input symbol sequence. At line 7 a nested iteration is initiated, invoking the goto function g 206 for the current state, state, and the current input symbol $t_i$. While the goto function g 206 returns fail, the pattern matching machine transitions to a failure state determined by the failure function 208 (Algorithm 3). Where the goto function g 206 does not return fail, the pattern matching machine 204 transitions to the state returned by the goto function g 206 at line 8. At line 9 the pattern matching machine 200 invokes the output function 210 for the current state, state, and where this provides a non-empty set of output symbol sequences 408, these are printed by way of the loop of line 11.

In one embodiment, the efficiency of operation of the pattern matching machine 204 can be further improved by indicating, for states having no failure state mappings, that the failure function will be unsuccessful. Such an indication can be stored with a state, or alternatively can be readily discerned by the set of failure state mappings 410. On an affirmative determination that there are no failure state mappings, the entirety of the failure function 208 processing can be avoided (or, alternatively, the determination that there are no failure state mappings can be conducted as an initial part of the failure state function 208).

Figure 22:
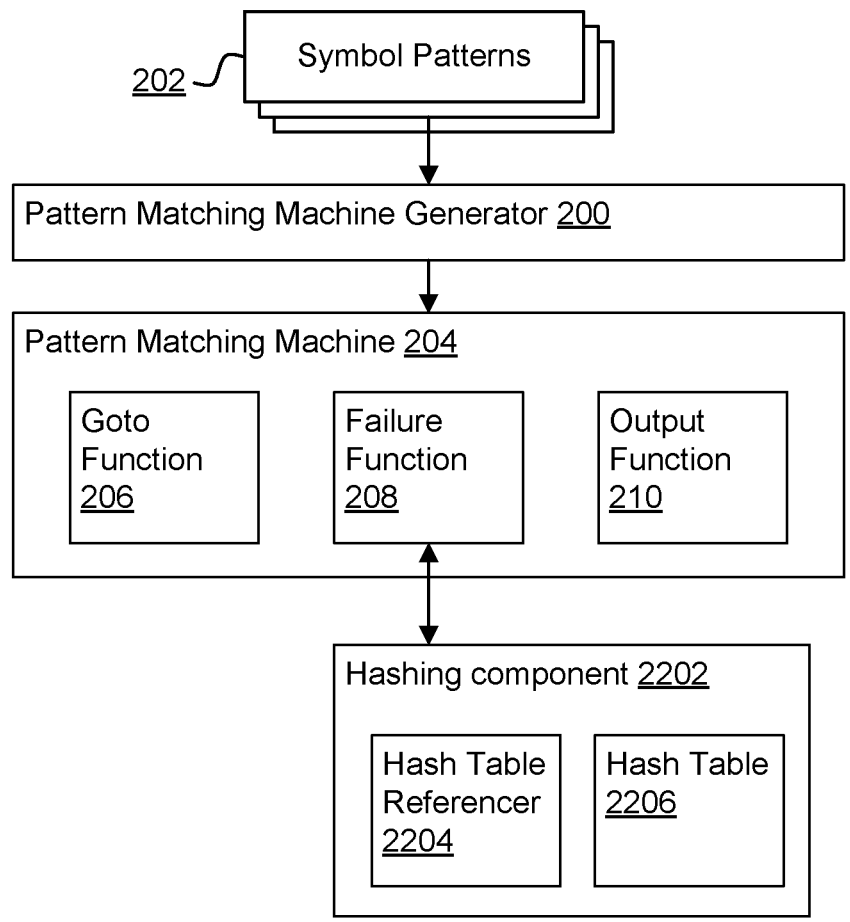
FIG. 22 is a schematic illustration of a pattern matching machine generator for generating a pattern matching machine in accordance with an embodiment of the present invention.

FIG. 22 is a schematic illustration of a pattern matching machine generator 200 for generating a pattern matching machine 204 in accordance with an embodiment of the present invention. Many of the features of FIG. 22 are identical to those described above with respect to FIG. 2 and these will not be described further here. Additionally, the pattern matching machine generator 200 is further adapted to generate failure function 208 and output function 210 suitable for referring to a hashing component 2202 for identifying a failure state for the pattern matching machine 204 in use executing in a state with a particular input symbol context. The hashing component 2202 is a software or hardware component including a hash table reference 2204 for referencing and retrieving a failure state from a hash table 2206 on the basis of a hashing key. The hashing key is generated by the hash table reference 2204 based on information supplied by the pattern matching machine 204 in use for matching symbol patterns 202 in an input symbol sequence.

The hash table 2206 is prepopulated by the pattern matching machine generator 200 when the pattern matching machine 204 is generated. When a failure state mapping is identified as part of the pattern matching machine generation process (as hereinbefore described), the failure state mapping is added to the hash table 2206 by generating a key for the hash table on the basis of a unique identifier of a state for which the failure state mapping applies and the guard stack symbols. A reference to the failure state of the failure state mapping is then stored in the hash table 2206 at a location identified on the basis of the generated key. Subsequently, at a runtime of the pattern matching machine 204 and in response to the goto function g 206 returning fail, the failure function 208 generates a hash table key on the basis of: a unique identifier of a current state of the pattern matching machine 204, such as the unique identifier 404 for state 402; and an input symbol context comprising symbols in the sequence of input symbols corresponding to a set of offsets 406. The unique identifier and the input symbol context, when taken together, uniquely identify a current state of the pattern matching machine 204 and the criteria for transitioning to a failure state based on an input symbol context. In particular, the input symbol context corresponds to the input symbols required for comparison with guard stack symbols, C, for a failure state mapping. Where the guard stack for all failure state mappings in the set of failure state mappings 410 is determinate, i.e. the guard stack consists exclusively of literal symbols, then the key for accessing the hash table will also be determinate, and the hashtable 2206 can be accessed with the key to identify a failure state for the pattern matching machine 204.

However, the guard stack for a failure state mapping can itself be indeterminate, such as the guard stack for the failure state mappings 2008 and 2006 in the exemplary embodiment of FIG. 20. These guard stacks include a wildcard symbol. The input symbol context corresponding to the value of input symbols used to transition along a failure state mapping having a guard stack with a wildcard symbol cannot be determined until a runtime of the pattern matching machine 204. Accordingly, the use of a guard stack to generate a key for a hashtable in order to lookup a failure state for a state and input symbol context is not possible, since the hashtable cannot be prepopulated when the pattern matching machine 204 is generated since the key requires an input symbol context.

To address these challenges the inventors have realised numerous advantageous modifications to the above described embodiments.

In one advantageous modification, the failure function is adapted to refer to a hash table using a key based on an input symbol context consisting of input symbols at offsets for only non-wildcard gate stack symbols. In this way, wildcard symbols in a gate stack are ignored and the generation of a hash key becomes determinate, both during hash table generation 2206 and at a runtime of the pattern matching machine 204. Preferably, to improve the efficiency of the technique, the failure state mappings can be sorted in the set of failure state mappings 410 such that the set 410 is an ordered set ordered by the number of literal guard stack symbols C in each failure state mapping. In this way, a selection of a failure state mapping having a greatest number of literal guard stack symbols C would be identified first. This also increases a likelihood that a number of wildcard guard stack symbols is reduced.

In an alternative modification, the set of failure state mappings, failure_set 410 is enhanced. In particular, the set of failure state mappings, failure_set 410, is enhanced to further exclude all wildcard guard stack symbols C. In this way, the guard stack symbols, C, for each failure state becomes determinate. However, the number of guard stack symbols, C, in each failure state mapping for a single state in the state machine may vary. Consequently, the enhanced set of failure state mappings, failure_set 410, must be provided as described below.

In accordance with the present embodiment, the failure state mappings, failure_set 410 for a state takes the enhanced form of a set of zero or more quadruples:

$\{(S_1, \{C_1 \ldots C_a\}, F_1, \{Y_1 \ldots Y_a\}), \ldots (S_p, \{C_1 \ldots C_b\}, F_p, \{Y_1 \ldots Y_b\})\}$ where S, $\{C_1 \ldots C_n\}$ and F correspond to a failure state, guard stack and output set size as previously described, except that the guard stack is always devoid of wildcard symbols. Additionally, the enhanced failure_set includes a set of offsets $\{Y_1 \ldots Y_n\}$ corresponding to offsets as a set of zero or more numerical offset values. Each offset in the set Y indicates a relative location, in an input symbol sequence received by the pattern matching machine 204 in use, to a symbol having been received in the input symbol sequence. In particular, the offsets $\{Y_1 \ldots Y_n\}$ indicate offsets of input symbols received by the pattern matching machine 204 to be used for comparing with the guard stack $\{C_1 \ldots C_n\}$ to determine if a failure state mapping is permitted by an input symbol context. Notably, the number, n, of offsets Y for a failure state mapping in failure_set must match the number, also n, of symbols C in the guard stack. The value of n can vary for different failure state mappings in a failure_set for a state in the state graph because guard stack symbols C, for a failure state mapping that correspond to wildcard symbols, are excluded from the guard stack. Accordingly, a failure state, S, corresponding to pattern symbols including one or more wildcard symbols that would, using the earlier described embodiments, constitute part of the guard stack C, are excluded from the guard stack in accordance with the present embodiment. In this way, wildcard symbols in a gate stack are ignored and the generation of a hash key becomes determinate, both during hash table generation 2206 and at a runtime of the pattern matching machine 204.

Thus, with the aforementioned advantageous adaptations to the arrangement of embodiments of the present invention, a hash table 2206 can be employed to provide timely access to a failure state mapping for a pattern matching machine 204 at runtime.

As noted above, in one embodiment, the efficiency of operation of the pattern matching machine 204 can be further improved by indicating, for states having no failure state mappings, that the failure function will be unsuccessful. Such an indication is particularly beneficial for avoiding hash table lookups unnecessarily when it is known, ahead of time (as part of the pattern matching machine 204 generation) that no failure states exist.

Figure 23:
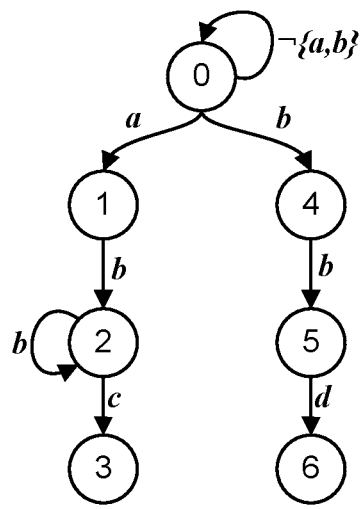
FIG. 23 depicts a state machine of a pattern matching machine corresponding to the symbol patterns 'ab+c' and 'bbd'.

Attention will now turn to iteration metacharacters in symbol patterns. FIG. 23 depicts a state machine of a pattern matching machine corresponding to the symbol patterns 'ab+c' and 'bbd'. The metacharacter '+' is an example of an indicator that one or more symbols in the symbol pattern (specifically, the symbol 'b' in pattern 'ab+c') may repeat or iterate as repeated or iterated symbols. Notably, such metacharacters can apply to individual symbols, as in the example 'ab+c', or multiple metacharacters, such as for example, a sequence of metacharacters bounded by parentheses such as 'a(bcd)+', in which the indicator '+' indicates that all of the symbols rbcd' may repeat one or more times.

It can be seen from FIG. 23 that there are various challenges applying the Aho-Corasick approach to a pattern matching machine for searching symbol patterns including iterations. Firstly, the output function cannot be readily associated with each state since, at state '3' of FIG. 23, the output is indeterminate when the state machine is generated. The length of the output at state '3' is in a range of between 3 and a potentially infinite number of symbols and, accordingly, the output function cannot be pre-defined for this state. Accordingly, the state machine must record all matched symbol patterns in the iteration of state 2 to output one or more appropriate matched symbol patterns. Further, it is not possible, in the state machine of FIG. 23, to implement the failure function of the Aho-Corasick approach for some symbols, even where there are conceivable symbol matches. For example, an input symbol sequence 'xxabbdxx' causes a goto function for the state machine of FIG. 23 to enter state '1' on receipt of the symbol 'a'. The state machine then enters state '2' on receipt of the first symbol 'b', and iterates state '2' on receipt of the second symbol 'b'. However, the goto function returns fail at state '2' on receipt of the symbol 'd'. Ideally a failure function will provide a failure mapping from state '2' to state '5' except that no such failure mapping can be defined since state '2' is generally in an indeterminate state, being on corresponding to an infinite number of states of the state machine of receiving symbols 'ab', 'abb', 'abbb', and so on, yet it is only when state '2' corresponds to state 'abb' that state 5 constitutes an appropriate failure state. Thus, state '2' in the state machine of FIG. 23 is non-deterministic (in that it can represent multiple different states of the state machine) and is not suitable for the Aho-Corasick approach.

A further challenge associated with iterative symbol patterns arises since a single series of input symbols from an input symbol sequence may match the iterative symbol pattern multiple times. Iterative symbol patterns are indicators that a symbol in a symbol pattern repeats, such as the metacharacters '+' (indicating 'one-or-more') and '*' (indicating 'zero-or-more') in accordance with the POSIX BRE specification. Consider, for example, the symbol pattern 'ab*' and the input symbol sequence 'abbb'. Within this input symbol sequence are four discrete symbol sequences that match the symbol pattern 'ab*'. These are: 'a'; 'ab'; 'abb'; and 'abbb'.

Thus there is also a need, notwithstanding the above described need to provide wildcard support for a state machine-based pattern matching machine, to provide support for iteration metacharacters in symbol patterns for such pattern matching machines in order that symbol patterns can be identified in an input symbol sequence based on a single pass of the input symbol sequence, as is provided by the Aho-Corasick approach for non-wildcard and non-iterative symbol patterns.

FIG. 24 is a schematic illustration of a pattern matching machine generator 2400 for generating a pattern matching machine 2404 in accordance with an embodiment of the present invention. The pattern matching machine generator 2204 of FIG. 23 includes a goto function generator 2420, a candidate prefix suffix identifier 2422 and a failure state locator 2424. These components 2420, 2422 and 2424 can correspond to the components 220, 222 and 224 of FIG. 2 where the benefits of the present embodiment are desired in combination with the benefits of the embodiments of any or all of FIGS. 2 to 22 with respect to wildcard pattern symbols. Alternatively, it will be appreciated by those skilled in the art on the basis of the teachings herein that the arrangement of FIG. 24 could be implemented using a conventional Aho-Corasick pattern matching machine generator such as is known from the Aho-Corasick paper referenced above. That is to say that the benefits of the present embodiment with respect to the addition of support for iteration metacharacters in symbol patterns can be combined with the beneficial wildcard support described in detail above, or could alternatively be provided for a convention Aho-Corasick pattern matching machine irrespective of wildcard support.

The pattern matching machine generator 2400 of FIG. 24 further includes a deterministic variant generator 2402 as a software or hardware component for identifying a set of deterministic variants for a symbol pattern as will be described in detail below. To provide support for iterative metacharacters in symbol patterns, the pattern matching machine generator 2400 imposes a maximum number of transitions, known as max_span, in a state graph of the pattern matching machine 2404 for each and every symbol pattern represented in the state graph. Further, the pattern matching machine generator 2400 generates the state graph of the pattern matching machine (i.e. the goto function 206) based on non-iterative variants of iterative symbol patterns generated in accordance with the maximum number of transitions. Thus, the pattern matching machine generator 2400 generates a finite determinate state graph of determinate states corresponding to a symbol pattern including indeterminate iterative metacharacters.

For example, the symbol pattern 'a+' with a maximum number of transitions in a corresponding state graph (max_span) of 5, can be converted to the set of determinate symbol patterns: 'a'; 'aa'; 'aaa'; 'aaaa'; 'aaaaa'. Each of these determinate symbol patterns can be said to be equivalent to the symbol pattern for a different number of repetitions of the repeated symbol. Notably, the equivalent symbol patterns comprise all possible symbol patterns equivalent to the symbol pattern 'a+' up to a maximum length of max_span. The value of max_span thus corresponds to a maximum number of transitions in a state graph and also, accordingly, a maximum length of equivalent symbol patterns generated for a pattern including a repetition indicator. Such symbol patterns can be readily represented as a state graph, such as by way of the graph generation function of Algorithm 1, or by way of the goto function generator of the Aho-Corasick paper. It is the function of the deterministic variant generator 2402 to generate such determinate symbol patterns, as is described below.

The max_span limitation is less onerous than it might first seem. A max_span implementation only limits the distance between a start of data matching a certain symbol pattern and an end of data matching the pattern. It imposes no limit on where, or how frequently, a pattern can be found within an input symbol sequence. Quite apart from the performance and operability benefits, it is also a reasonable restriction to impose in terms of practical applications of symbolic pattern matchers. Consider, for example, the field of intrusion detection systems. Such systems are typically tasked with symbol patterns such as regular expressions designed to detect patterns present in maliciously crafted network packets. It is extremely unlikely that such patterns could not be said to reasonably span a maximum number of characters. Indeed, there are often contextual limits to how many characters a pattern will span. For instance, it might be that, for a particular network attack to be successful, the malicious bytes need to fit within a target data structure that is of finite, fixed or otherwise limited size. In a more extreme case, it may be that this finite size is the maximum size of an Ethernet frame, for example. Thus, depending on the context of application of a pattern matching machine 2404, an appropriate and acceptable value of max_span for a particular symbol pattern or set of symbol patterns can be determined.

The selection of a value of max_span is configurable by a user, designer or developer of the pattern matching machine generator 2400, or can be received as a parameter by the pattern matching machine generator 2400 which can be specific to one or more symbol patterns 202. Since the value of max_span is largely application, resource or preference specific, it can be expected that some consideration is required before selection of a particular value. Nonetheless, a reasonable default value can be defined that may suit most common purposes, since essentially, the value of max_span serves to limit the maximum length of a matching input symbol sequence.

The function and operation of the deterministic variant generator 2402 will now be described. The deterministic variant generator 240 generates a set of deterministic variant symbol patterns for a potentially non-deterministic symbol pattern, such as a symbol pattern containing one or more wildcard symbols such as '*' and '+'. The deterministic variant generator 2402 generates only as many deterministic symbol patterns as are occasioned based on the max_span value defined. A set of deterministic variants generated by the deterministic variant generator 2402 for a symbol pattern containing no iterative metacharacters will include only one element corresponding to the symbol pattern. A set of deterministic variants for a symbol pattern containing one or more iterative metacharacters will include one element corresponding to each possible variant of the symbol pattern, accounting for the iteration of the iterative element(s) of the symbol pattern, and the max_span value.

In one embodiment, an algorithm for the deterministic variant generator 2402 is provided below as Algorithm 6. The algorithm, Generate_deterministic_variants, or gdv, is a recursive algorithm that receives, as input, a set of symbol pattern element pairs $\{(a_1, T_n), \ldots (a_n, T_n)\}$. A symbol pattern element pair consists of a symbol pattern element, a, and a type of the symbol pattern element, T. An element of a symbol pattern shall be considered here to be every part of symbol pattern that is either an iterated part, or a non-iterated part. Whether the element is iterated or not iterated is indicated by the element type, T. By way of example, the symbol pattern 'av(de)+e*' includes three symbol pattern elements: 'av' (non-iterated); 'de' (iterated by '+'); and 'e' (iterated by '*'). Note how there can be multiple types of iterated symbol elements, such as '+ indicating 'one-or-more' and '*' indicating 'zero-or-more'. Such distinctions are indicated by the element type, T. Thus, a set of symbol pattern element pairs for the symbol pattern 'av(de)+e*' is:

{('av', non-iterated), ('de', one-or-more), ('e', zero-or-more)}

It will be apparent to the skilled person, in view of the teachings herein, how to convert any symbol pattern to a series of symbol pattern elements as described above.

The gdv algorithm returns a set, V, of all possible determinative variants of a symbol pattern, each variant conforming to a defined max_span value for a maximum number of transitions required to implement the variant as a directed graph for a pattern matching machine 2404. In use, the gdv algorithm refers to global data items including the set of variants, V, and the max_span value. Additionally, a pattern_stack, P, and a numerical value consumed, are maintained and globally referenced by all recursive executions of the gdv algorithm for a symbol pattern. The pattern_stack, P, is used at runtime of the gdv algorithm to maintain a current state of pattern symbols parsed by the recursive execution of the algorithm. Further, the consumed variable records a number of transitions required to implement symbols in a current pattern_stack, P, as a state graph.

Algorithm 6: Generate_deterministic_variants (gdv)
Input: set of symbol pattern element pairs A = { $(a_1$, Tn), ... $(a_n$, -continued

```
        Tn) }
    Output: set of variants V
    Globals : set of variants V = { }; pattern_stack P = { }; max_span;
    consumed = 0
1   Begin
2       T1 ≠ iteration?
3       begin
4           consumed ← consumed + length (a1)
5           push a1 to pattern_stack
6           if { (a2,T2), ... (an, Tn) } ≠ empty set
7           begin
8               gdv ( { (a2,T2), ... (an, Tn) } )
9           end
10          If (consumed > max_span) // unwinding return
11          begin
12              pop pattern_stack (a1)
13              consumed ← consumed − length(a1)
14              return
15          end
16      end
17      else
18      begin
19          j ← 0
20          if T1 = 'one-or-more' then
21          begin // "one-or-more" - add an initial a1 (i.e. the first
                symbol is not optional)
22              consumed ← consumed + length (a1)
23              push a1 to pattern_stack
24              j ← j + 1 // count how many iterated elements
                added
25          end
26
27          while (consumed < max_span)
28              if ( { (a2,T2, ... (an, Tn) } ≠ empty set) do
29              begin
30                  gdv ( { (a2,T2), ... (an, Tn) } )
31              end
32              else add pattern_stack to V    // iteration is the last
                    element
33              consumed ← consumed + length (a1)
34              push a1 to pattern_stack
35              j ← j + 1 // count how many iterated elements
                added
36          end
37
38          If (consumed > max_span)
39          begin // unwinding return
40              for i ← 1 to j do // pop all iterated elements added
41              begin
42                  pop pattern_stack (a1)
43                  consumed ← consumed − length (a1)
44              end
45              return
46          end
47      end
48
49      if { (a2,T2, ... (an, Tn) } = empty set
50      begin // last element
51          add pattern_stack to V
52      end
53
54      pop pattern_stack (a1)
55      consumed ← consumed − length (a1)
56      return
57  end
58  end
```

Considering the gdv algorithm, Algorithm 6, at line 2 the algorithm determines if a type, T, of a first pattern symbol element, $a_1$, is an iteration type, such as a 'one-or-more' ('+') or 'zero-or-more' ('*') iteration. Where T is non-iterative the algorithm increases the consumed value by the length of the first pattern symbol element, $a_1$ (line 4) and pushes the symbol pattern element $a_1$ to the pattern_stack (line 5). At line 6 the algorithm determines if the subset of the set of symbol element pairs $\{(a_2, T_2), \ldots (a_n, T_n)\}$ (i.e. all symbol element pairs except the first symbol element pair) is an empty set. If this set is empty, then the symbol element ($a_1$, $T_1$) is the only symbol element, and in particular, the last symbol element, for the set of symbol element pairs. Where it is determined that this is not an empty set, the algorithm recurses at line 8 for the subset of the set of symbol element pairs $\{(a_2, T_2), \ldots (a_n, T_n)\}$. At line 10 the algorithm determines if the number of symbols consumed by the current pattern_stack exceeds max_span, and where this is determined in the affirmative, the algorithm 'unwinds' the pattern_stack by popping the most recent entry on the stack, that corresponds to $a_1$, and reducing the consumed value by the length of $a_1$. In this case, the algorithm returns at line 14.

Where the algorithm determines, at line 2, that a type, T, of a first pattern symbol element, $a_1$, is an iteration type, the algorithm initialises a counter, j, at line 19 to record a number of times the iterative symbol element $a_1$ is added to the pattern_stack. At line 20 the algorithm tests if the type, T, of the first pattern symbol element is a 'one-or-more' ('+') iteration type. If this is determined in the affirmative, then the first pattern symbol element is pushed to the pattern_stack, with a corresponding increase in the value of consumed, and the counter j at lines 22 to 24. At line 27 the algorithm initiates an iteration while the number of symbols consumed by the pattern_stack is less than the max_span. Within the loop, the algorithm initially tests for an empty set $\{(a_2, T_2), \ldots (a_n, T_n)\}$ to determine if $a_1$ is the last symbol element. Where this is determined in the negative, the algorithm recurses at line 30 for the subset $\{(a_2, T_2), \ldots (a_n, T_n)\}$. Alternatively, where the determination is affirmative, and $a_1$ is determined to be the last symbol element, the pattern_stack is added to the set of variants, V, at line 32. Subsequently, at line 33, the first pattern symbol element is pushed to the pattern_stack, with a corresponding increase in the value of consumed, and the counter j at lines 33 to 35, and the loop reiterates to line 27 if occasioned by the loop condition.

On completion of the loop of lines 27 to 36, the algorithm determines if the number of symbols consumed by the current pattern_stack exceeds max_span at line 38, and where this is determined in the affirmative, the algorithm 'unwinds' the pattern_stack by popping the most recent entries on the stack, that corresponds to $a_1$. The stack is popped a number of times corresponding to the counter j to ensure all occurrences of $a_1$ pushed to the stack at lines 23 and/or 34 are removed. The consumed value is also reduced by the length of $a_1$ at line 43 for each occasion the stack is popped, and the algorithm returns at line 45.

At line 49 the algorithm determines if the set $\{(a_2, T_2), \ldots (a_n, T_n)\}$ is empty. This is used to determine if $a_1$ is the last symbol element. Where this is determined in the affirmative, the pattern_stack is added to the set of variants, V, at line 51. Subsequently, at lines 54 the algorithm pops the most recent entry on the stack, corresponding to $a_1$, and reduces the consumed value by the length of $a_1$ at lines 54 and 55. The algorithm returns at line 56.

The gdv algorithm, Algorithm 6, will now be considered in detail in use for the exemplary symbol pattern 'ab+cd'. FIGS. 25a to 25h show the operation of the gdv algorithm in accordance with an exemplary embodiment of the present invention for the symbol pattern 'ab+cd' with a max_span value of 7. As can be seen from these Figures, the resulting variants set V following processing of the gdv algorithm is:
{{'a', 'b', 'cd'}, {'a', 'b'm 'b', 'cd'}, {'a', 'b', 'b', 'b', 'cd'}, {'a', 'b', 'b', 'b', 'b', 'cd'}}

Thus, the gdy algorithm provides a set V of all deterministic variant symbol patterns for the non-deterministic symbol pattern 'ab+cd' within the max_span constraint. It will be appreciated by those skilled in the art, in view of the teachings herein, that each symbol pattern in such a set of symbol patterns is readily used to generate a goto function, such as by use of the Algorithm 1 described above of the functions of the Aho-Corasick paper. Accordingly, the gdy algorithm used in accordance with embodiments of the present invention provides for the representation of symbol patterns including iteration metacharacters in a state graph of a pattern matching machine 2404. Failure function 2408 can be further provided, using either the approach described above with respect to embodiments of the present invention, or the approach of the Aho-Corasick paper, such that multiple symbol patterns, each potentially including iteration metacharacters, can be searched in an input symbol sequence based on only a single pass of the input symbol sequence.

Figure 26:
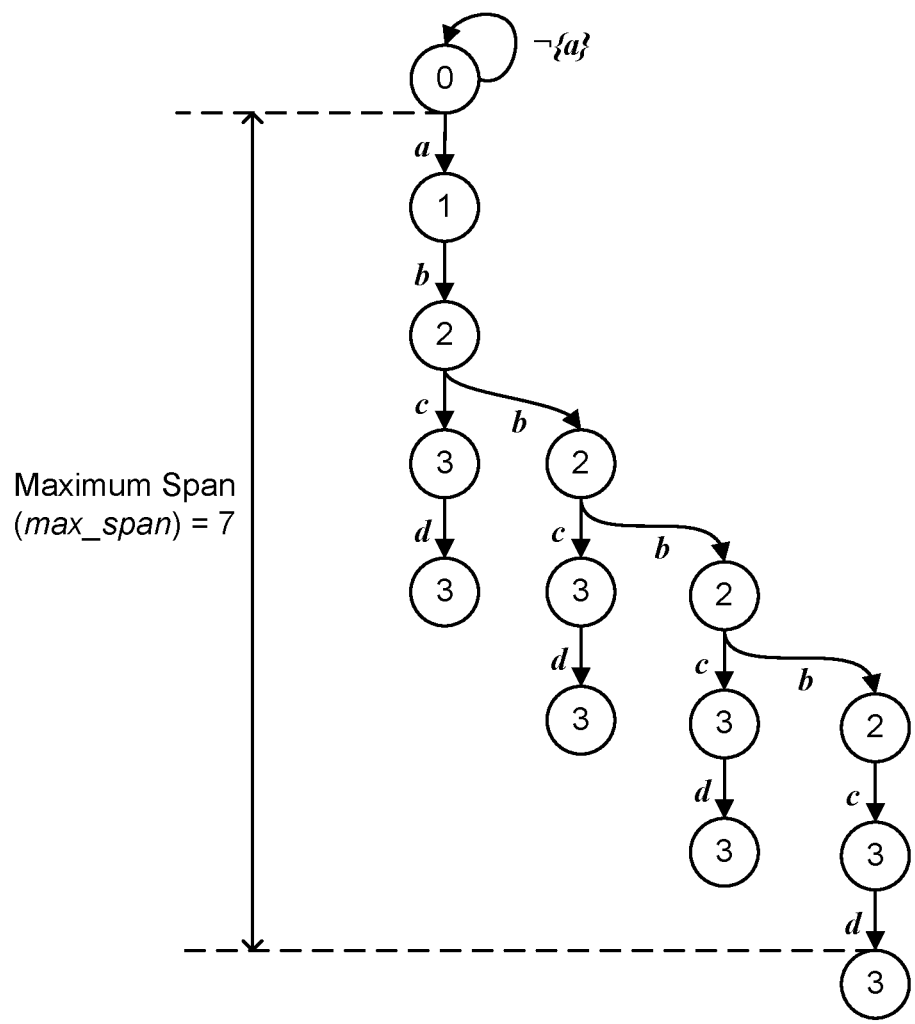
FIG. 26 depicts a state graph of a pattern matching machine for the symbol pattern 'ab+cd' generated by a pattern matching machine generator in accordance with an embodiment of the present invention.

FIG. 26 depicts a state graph of a pattern matching machine 2404 for the symbol pattern 'ab+cd' generated by a pattern matching machine generator 2400 in accordance with an embodiment of the present invention. It can be seen, from FIG. 26, that the max_span value is enforced by the gdy algorithm of the present invention to provide all possible variants of the symbol pattern 'ab+cd' within a state machine.

It will be apparent to those skilled in the art, in view and on the basis of the present teachings, that the approach of embodiments described above and with reference to FIGS. 1 to 22 for supporting wildcard metacharacters can equally be applied to the state graphs generated from the embodiments of FIGS. 24 to 25h to provide a pattern matching machine suitable for identifying multiple symbol patterns in an input symbol sequence based on a single pass of the input symbol sequence and supporting symbol patterns including wildcard and/or iterative metacharacters.

Embodiments of the present invention further provide for the processing of an input string for multiple symbol pattern matching in parallel where one or more of the symbol patterns includes iterative metacharacters. Parallel matching can employ parallel processing means such as a multi-processor, multi-core, multi-thread or auxiliary-processor computer system, a supplementary processor of a computer system in addition to a central processor, such as a logic or arithmetic processor, a graphics processing unit (GPU), a peripheral processor or similar, or a plurality of cooperating computer systems, each of which could be single or multi-processor systems. It is known to perform string matching with parallel computer architectures from "Aho-Corasick String Matching on Shared and Distributed-Memory Parallel Architectures" (Antonino Tumeo and Daniel Chavarria-Miranda, IEEE Transactions on Parallel and Distributed Systems, Vol. 23, No. 3, March 2012) (Tumeo). Tumeo describes the use of a deterministic finite-state automaton used by multiple threads or processes executing concurrently. According to Tumeo, an input stream is split into chunks which are then assigned to each processing element. The chunks overlap partially to allow for matching of patterns that cross a boundary. Tumeo specifies that the extent of overlapping is equal to the length of the longest pattern minus one symbol. Thus, for the approach of Tumeo to be effective, it is necessary and assumed, in Tumeo, that all patterns are of determined length in order that an extent of overlapping can be determined. In this way, in Tumeo, pattern matches that occur spanning multiple chunks are not missed as part of the parallelising of the Aho-Corasick approach across multiple processes or threads. Thus it can be seen that symbol patterns having iterative metacharacters of indeterminate length cannot be used with the Tumeo approach, because Tumeo requires a determinate length of each symbol patterns. Accordingly, embodiments of the present invention are suitable for converting symbol patterns having iterative metacharacters of indeterminate length into a set of one or more equivalent symbol patterns of determinate length, on the bases if a predetermined max_span value. The max_span value effectively limits the length of the symbol pattern and is suitable for determining an extent of overlap of clusters of input patterns when clustered for parallel matching processes, such as the processes of Tumeo. Notably, the embodiments of the present invention relating to iterative metacharacters and wildcard metacharacters can equally be applied to the approach of Tumeo either separately or in combination to provide a comprehensive approach to symbol pattern matching using the single pass Aho-Corasick approach either in single process/thread environments or parallel process/thread environments.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for generating a pattern matching machine for identifying matches of a plurality of symbol patterns in a sequence of input symbols, the method comprising:

providing a state machine of states and directed transitions between states corresponding to the plurality of patterns; and applying a modified Aho-Corasick approach to identify one or more mappings between states in the event of a failure, of the state machine in a state and for an input symbol, to transition to a subsequent state based on the directed transitions of the state machine, wherein one of the symbol patterns includes a wildcard symbol, and wherein at least one of the one or more mappings between states in the event of a failure identifies as its respective subsequent state a state, other than an initial state, representing pattern symbols including the wildcard symbol provided in a hash table referenced based on a key, the key being based on a unique identifier of the state and the input symbol to be received, by the pattern matching machine in use, to constitute the wildcard symbol, the value of the wildcard symbol being not determinate when the one or more mappings is/are generated.

2. The method of claim 1 further comprising providing an output function for selected states in the state machine, the selected states being states representing a pattern symbol sequence corresponding to one or more matched patterns.

3. The method of claim 1 wherein the pattern matching machine is generated as a software component for execution in a computer system.

4. A computer implemented method for pattern matching a plurality of symbol patterns in a sequence of input symbols, where at least one symbol pattern includes a wildcard symbol, the method comprising:

receiving a pattern matching machine for the plurality of patterns, the pattern matching machine being generated in accordance with the method of claim 1; and executing the pattern matching machine for symbols in the sequence of input symbols so as to trigger an output function for sub-sequences of symbols in the sequence of input symbols matching one or more symbol patterns.

5. A non-transitory computer program element comprising computer program code to, when loaded into a computer system including at least one processor and executed thereon, cause the computer system to perform the method of claim 1.

6. The method of claim 1 wherein the one or more mappings is/are identified so as to not require literal identity between all symbols in the sequence of input symbols and symbols corresponding to transitions between states leading to a current state.

7. The method of claim 1 wherein:

each mapping is a failure state mapping;

states from which transitions corresponding to wildcard symbols originate are ineligible for the identification of one or more mappings in the event of a failure;

each said failure state mapping includes a condition based on symbols in a received input symbol sequence, wherein the condition being satisfied identifies the failure state mapping appropriate for that received input symbol sequence provided that that failure state mapping exists; and each state has output that is based on the one or more failure state mappings and that where appropriate identifies one or more failure states based on symbols in the input symbol sequence constituting wildcard symbols in the symbol pattern.

8. The method of claim 1 wherein each mapping is a failure state mapping;

and further comprising omitting failure state mappings for states determined to be exempt from failure state mapping.

9. The method of claim 1 wherein the one or more mappings are supplemented with logic to account for potentially variable values in the input symbols to be received by the pattern matching machine in use.

10. A pattern matching machine generating system configured to generate a pattern matching machine for identifying matches of a plurality of symbol patterns in a sequence of input symbols, the pattern matching machine generating system comprising:

an electronic computer mediated interface configured to receive the sequence of input symbols; and at least one processor and a memory, the memory storing instructions that, when executed by the at least one processor, perform functionality comprising:

providing a state machine of states and directed transitions between states corresponding to the plurality of patterns;

applying a modified Aho-Corasick approach to identify one or more mappings between states in the event of a failure, of the state machine in a state and for an input symbol, to transition to a subsequent state based on the directed transitions of the state machine, wherein one of the symbol patterns includes a wildcard symbol, and wherein at least one of the one or more mappings between states in the event of a failure identifies as its respective subsequent state a state, other than an initial state, representing pattern symbols including the wildcard symbol provided in a hash table referenced based on a key, the key being based on a unique identifier of the state and the input symbol to be received, by the pattern matching machine in use, to constitute the wildcard symbol, the value of the wildcard symbol being not determinate when the one or more mappings is/are generated.

11. The system of claim 10 wherein the pattern matching machine is generated as a software component for execution in a computer system.

12. A non-transitory computer readable storage medium storing a pattern matching machine generated by the pattern matching machine generating system of claim 10, the pattern matching machine being executable by processing resources including at least one processor to match a plurality of symbol patterns in a sequence of input symbols, where at least one symbol pattern includes a wildcard symbol, wherein the pattern matching machine is executable so as to trigger an output function component of the pattern matching machine for sub-sequences of symbols in the sequence of input symbols matching one or more symbol patterns.

13. A computer implemented method for generating a pattern matching component for identifying matches of a plurality of symbol patterns in a sequence of input symbols, the method comprising:

providing a state machine of states and directed transitions between states corresponding to the plurality of patterns such that the state machine includes at least a starting state and additional states, each additional state representing a state in a sequence of pattern symbols for one or more patterns; and providing, for each state, a failure function for mapping each of one or more states, as a mapped state, to a new state in the state machine, the new state being identified as a state representing a pattern symbol sequence corresponding to a longest proper suffix of the pattern symbol sequence of the mapped state, and the failure function being operable in response to a determination that all directed transitions from the mapped state are not occasioned by an input character, wherein the new state is identified as the starting state in the absence of a state representing a pattern symbol sequence corresponding to a proper suffix of the pattern symbol sequence of the mapped state; and wherein at least one pattern includes at least one wildcard symbol, the value of the at least one wildcard symbol being not determinate when the one or more mappings is/are generated, the failure function for each state representing a pattern symbol sequence including one or more wildcard symbols mapping to one or more new states based on one or more input symbols to be received, by the pattern matching machine in use, to constitute each of the one or more wildcard symbols, and the mapping being provided in a hash table referenced based on a key, the key being based on a unique identifier of the mapped state and the one or more input symbols to be received.

14. The method of claim 13 wherein a subset of the one or more of the input symbols to be received, by the pattern matching in use, is excluded from one or more input symbols used to determine the key.

15. The method of claim 14 wherein the excluded input symbols are input symbols corresponding to wildcard pattern symbols of one or more of the new states.

16. The method of claim 13 wherein the one or more mappings is/are identified so as to not require literal identity between all symbols in the sequence of input symbols and symbols corresponding to transitions between states leading to a current state.

17. The method of claim 13 wherein:
states from which transitions corresponding to wildcard symbols originate are ineligible for having failure functions provided therefor;
each said failure functions includes a condition based on symbols in a received input symbol sequence, wherein the condition being satisfied identifies the failure function appropriate for that received input symbol sequence provided that that failure function exists; and
each state has output that is based on the failure functions and that where appropriate identifies one or more failure functions based on symbols in the input symbol sequence constituting wildcard symbols in the symbol pattern.

18. The method of claim 13 further comprising:
determining whether states are exempt from failure state mapping; and
omitting the provision of failure functions for those states determined to be exempt from failure state mapping.

19. A pattern matching machine generating system configured to generate a pattern matching machine for identifying matches of a plurality of symbol patterns in a sequence of input symbols, the pattern matching machine generating system comprising:

an electronic computer mediated interface configured to receive the sequence of input symbols; and at least one processor and a memory, the memory storing instructions that, when executed by the at least one processor, perform functionality comprising:
providing a state machine of states and directed transitions between states corresponding to the plurality of patterns such that the state machine includes at least a starting state and additional states, each additional state representing a state in a sequence of pattern symbols for one or more patterns;
providing, for each state, a failure function for mapping each of one or more states, as a mapped state, to a new state in the state machine, the new state being identified as a state representing a pattern symbol sequence corresponding to a longest proper suffix of the pattern symbol sequence of the mapped state, and the failure function being operable in response to a determination that all directed transitions from the mapped state are not occasioned by an input character, wherein the new state is identified as the starting state in the absence of a state representing a pattern symbol sequence corresponding to a proper suffix of the pattern symbol sequence of the mapped state; and wherein at least one pattern includes at least one wildcard symbol, the value of the at least one wildcard symbol being not determinate when the one or more mappings is/are generated, the failure function for each state representing a pattern symbol sequence including one or more wildcard symbols mapping to one or more new states based on one or more input symbols to be received, by the pattern matching machine in use, to constitute each of the one or more wildcard symbols, and the mapping being provided in a hash table referenced based on a key, the key being based on a unique identifier of the mapped state and the one or more input symbols to be received.

20. The system of claim 19 wherein a subset of the one or more of the input symbols to be received, by the pattern matching in use, is excluded from one or more input symbols used to determine the key.

21. The system of claim 20 wherein the excluded input symbols are input symbols corresponding to wildcard pattern symbols of one or more of the new states.

22. The system of claim 19 further comprising an output function generator component configured to provide an output function for selected states in the state machine, the selected states being states representing a pattern symbol sequence corresponding to one or more matched patterns.

* * * * *